United States Patent [19]
Kakii

[11] Patent Number: 6,005,604
[45] Date of Patent: Dec. 21, 1999

[54] TWO-WAY INTERACTIVE SYSTEM, TERMINAL EQUIPMENT AND IMAGE PICK-UP APPARATUS HAVING MECHANISM FOR MATCHING LINES OF SIGHT BETWEEN INTERLOCUTORS THROUGH TRANSMISSION MEANS

[75] Inventor: Toshiaki Kakii, Yokohama, Japan

[73] Assignee: Sumitomo Electric Industries, Ltd., Osaka, Japan

[21] Appl. No.: 09/121,308

[22] Filed: Jul. 23, 1998

Related U.S. Application Data

[62] Division of application No. 08/606,044, Feb. 16, 1996, Pat. No. 5,815,197.

[30] Foreign Application Priority Data

Oct. 18, 1997 [DE] Germany .............................. 197 46 132

[51] Int. Cl.⁶ ...................................................... H04N 7/14
[52] U.S. Cl. .................................................. 348/20; 348/15
[58] Field of Search ........................... 348/14, 15, 16–20; 329/93.21, 202; H04N 7/14, 7/18

[56] References Cited

U.S. PATENT DOCUMENTS

| 5,117,285 | 5/1992 | Nelson et al. | 348/20 |
| 5,666,155 | 9/1997 | Mersereau | 348/20 |

FOREIGN PATENT DOCUMENTS

| 62-269128 | 11/1987 | Japan . |
| 4-81088 | 3/1992 | Japan . |
| 4-810880 | 3/1992 | Japan . |
| 4-97663 | 3/1992 | Japan . |
| 4-213287 | 8/1992 | Japan . |
| 4-223688 | 8/1992 | Japan . |

Primary Examiner—Curtis A. Kuntz
Assistant Examiner—Melur Ramakrishnaiah
Attorney, Agent, or Firm—Pillsbury Madison & Sutro, LLP

[57] ABSTRACT

This invention is to provide a system having a mechanism for matching lines of sight between interlocutors through transmission means to realize smooth counseling between the interlocutors in remote areas, and mainly oriented to a one-to-one two-way interactive operation, and this system is realized on the basis of results of experiments by the present inventor. In this system, a terminal equipment is located at the point of each interlocutor, which is constituted by a display unit having a monitor for displaying at least the image of a partner, a position regulation means for regulating the position of the interlocutor with respect to a monitor screen, and an image pickup apparatus having an image pickup unit for picking up the image of the interlocutor and a support mechanism for setting the image pickup unit at a predetermined position between the interlocutor and the monitor. Particularly, the image pickup unit is set in a line-of-sight matching area defined by the distance from the interlocutor to the monitor, which is specified by the position regulation means, and a parallactic angle for determining that the line of sight of the interlocutor matches the line of sight of the monitor image of the partner, thereby the monitor image of the partner is partially shielded with respect to the interlocutor. Therefore, according to this system, no special structure or device for ensuring the field of the interlocutor is needed. Line-of-sight matching between interlocutors is realized with a simple arrangement at a low cost.

8 Claims, 13 Drawing Sheets

TWO-WAY INTERACTIVE SYSTEM, TERMINAL EQUIPMENT AND IMAGE PICK-UP APPARATUS HAVING MECHANISM FOR MATCHING LINES OF SIGHT BETWEEN INTERLOCUTORS THROUGH TRANSMISSION MEANS

This is a division of application Ser. No. 08/606,044, filed Feb. 16, 1996, 5,815,193.

BACKGROUND OF THE INVENTION

1. Field of the Invention

The present invention relates to a two-way interactive system having a mechanism for matching lines of sight between interlocutors through a transmission means, and a terminal equipment and an image pickup apparatus constituting the system and, more particularly, to a counseling system which realizes a two-way interactive operation between, e.g., a doctor and a patient or a counselor and a client in remote areas through a transmission means and is mainly oriented to a one-to-one two-way interactive operation, and an apparatus constituting the system.

2. Related Background Art

Conventionally, counseling in the field of education, medical service, psychology, or the like is generally performed between interlocutors directly facing each other while establishing an intimate reliability relationship between them. In some cases, however, a person who needs counseling and a person (counselor) who has mastered a counseling technique can hardly share place and time because a natural disaster has occurred, or they are in remote areas. Along with a progress in communication technology, a system for realizing counseling between persons in remote areas is strongly demanded.

In construction of such a counseling system by using a communication technology, to ensure an intimate relationship between interlocutors and an ideal counseling environment, as in the conventional face-to-face system, it is important to match the lines of sight between the interlocutors.

A conventional image pickup apparatus for matching the lines of sight between interlocutors through a transmission line is disclosed in Japanese Patent Laid-Open No. 62-269128 (first prior art). In the first prior art, a half mirror is provided between an interlocutor and the image pickup apparatus, so that light from the interlocutor as an object is divided toward the image pickup apparatus and toward an image display apparatus. Therefore, according to the arrangement of the first prior art, the image pickup apparatus is arranged at a position offset from the display screen of the image display apparatus at which the interlocutor looks, thereby matching the optical axis of light incident in the image pickup apparatus with the line of sight of the interlocutor.

Another image pickup apparatus is disclosed in Japanese Patent Laid-Open No. 4-213287 (second prior art) in which a special display apparatus capable of selecting reflection/transmission of light is used, and an image pickup apparatus is arranged behind the display apparatus (on the opposite side of an interlocutor through the display apparatus). According to this arrangement, the line of sight of the interlocutor is directed to the display apparatus, i.e., the image pickup apparatus arranged behind the display apparatus at a position offset from the display screen of the display apparatus at which the interlocutor looks, so that the lines of sight between interlocutors can be matched each other.

A still another image pickup apparatus is disclosed in Japanese Patent Laid-Open No. 4-97633 (third prior art) in which a small-size mirror or a small-size half mirror is attached to the upper portion of a display apparatus, and the image of an interlocutor is picked up by a small-size camera with an optical axis directed to the mirror. According to this arrangement, the image of the interlocutor, which is reflected by the mirror, is picked up by the small-size camera arranged at a position offset from the display screen of a display apparatus at which the interlocutor looks. Therefore, the angle of elevation of the line of sight of the interlocutor is suppressed to 10° or less, which is an allowance for line-of-sight matching in the vertical direction, so that the lines of sight between interlocutors can be matched each other.

SUMMARY OF THE INVENTION

Upon examination of the above prior arts, the present inventor found the following problems.

In the first prior art in which light is separated from an object by a half mirror, a half mirror in almost the same size as that of the screen of the display apparatus is needed. Inevitably, a large space is required to accommodate such a large mirror. Particularly, it is difficult to manufacture an apparatus with a screen size of 40 inches or more. In addition, since a half mirror is used, an image picked up by the image pickup apparatus arranged at a position offset from the screen where an interlocutor's image is displayed is darkened, so no ideal counseling environment can be realized.

The second prior art using a special display apparatus for selecting reflection/transmission of light cannot be incorporated in a commercially available mass-produced TV set. For this reason, to realize a system using this principle, a dedicated machine must be developed, resulting in an increase in cost of the apparatus. The image pickup apparatus for picking up the image of an interlocutor is set to pick up the image of the interlocutor through the special display apparatus. Therefore, the picked-up image of the interlocutor is darkened, so no ideal counseling environment can be realized.

In the third prior art which combines a reflecting mirror and a small-size camera, the camera is arranged at a position offset from the display screen at which an interlocutor looks, and the image of the interlocutor is picked up through the small-size reflecting mirror. For this reason, the picked-up person's image is darkened. To obtain a large field angle, the reflecting mirror must have a size larger than that of the small-size camera, and person's image display on the display apparatus is interfered with this large reflecting mirror. If the position of the person to be picked up changes, the small-size camera cannot follow up the movement because the image pickup direction cannot be changed. Therefore, matching of the lines of sight between interlocutors cannot always be ensured.

The characteristics of the above-mentioned prior arts are structurally common in that the image pickup apparatus (including a camera) is arranged at a position offset from a space between the display screen at which an interlocutor looks (screen on which the image of a partner interlocutor is displayed) and the interlocutor. In other words, to match the lines of sight between interlocutors, a reflecting mirror, a half mirror, or a special display apparatus must be set between an interlocutor and the image pickup apparatus. Therefore, the transmitted image of the partner is darkened, so no ideal counseling environment can be realized.

It is an object of the present invention to provide a two-way interactive system and an apparatus constituting the system which has a mechanism for matching lines of sight between interlocutors through a transmission means to minimize the sense of incompatibility during an interactive operation between interlocutors in remote areas. Particularly, the two-way interactive system according to the present invention has as its object to create an organic relationship between interlocutors (realize close communication) and provide an ideal counseling environment by integrally processing voice information (including a background music (BGM)), character/graphic information, and the like, in-addition to the images of the interlocutors.

According to the present invention, there is provided a two-way interactive system comprising a first terminal equipment located at a first point where a first interlocutor is present, a second terminal equipment located at a second point where a second interlocutor is present, and transmission means, arranged between the first terminal equipment and the second terminal equipment, for enabling two-way communication of at least image/voice data of the first interlocutor and the second interlocutor. In this system, at least the first terminal equipment comprises a display unit for displaying an image of the second interlocutor, which is received through the transmission means, on a monitor, position regulation means for regulating a position of the first interlocutor to define at least a distance between the first interlocutor and the display means, and an image pickup apparatus for transmitting the picked-up image of the first interlocutor to the second terminal equipment through the transmission means.

The image pickup apparatus has at least an image pickup unit for picking up the image of the first interlocutor and a support mechanism for setting the image pickup unit at a predetermined position between the first interlocutor and the monitor while the image pickup direction of the image pickup unit is set directly toward the first interlocutor. Particularly, the image pickup unit is set in a line-of-sight matching area defined by (1) a distance between the monitor and the first interlocutor, which is regulated by the position regulation means, and (2) a parallactic angle for determining that a line of sight of the first interlocutor matches a line of sight of the monitor image of the second interlocutor, so that the monitor image of the second interlocutor is partially shielded with respect to the first interlocutor. The second terminal equipment may have the same arrangement. The first terminal equipment can remote-control the second terminal equipment. Each terminal equipment has a sound absorbing member arranged around the interlocutor and having external sound insulating properties. Therefore, mental obstacles to leakage of interactive operation contents are decreased, and the sound quality is improved, so that mind concentration is enabled to allow a close interactive operation.

As described above, the image pickup unit is set in the line-of-sight matching area between the interlocutor and the monitor, so that the monitor image is partially shielded. This is because the present inventor confirmed on the basis of an experiment that, even when the image pickup unit was set to partially shield the person's image displayed on the monitor, the presence of the image pickup unit hardly influenced on a two-way interactive operation as far as the size of the image pickup unit was below a predetermined value.

In the above two-way interactive system, the parallactic angle for matching the line of sight of the interlocutor (first interlocutor) with the line of sight of the image (monitor image) of the person (second interlocutor) displayed on the monitor is preferably 4.5° or less in the horizontal direction of the monitor screen, 12° or less in the upper direction, and 8° or less in the lower direction when viewed from the interlocutor. To realize an ideal line-of-sight matching state, the parallactic angle is more preferably 3° or less in the horizontal and vertical directions of the monitor screen with respect to the line of sight of the interlocutor when viewed from the interlocutor. Particularly, as shown in FIG. 8, an angle formed by a line perpendicular to a photoelectric conversion surface 208 of an image pickup device 205 and passing through the photoelectric conversion surface 208 and the first interlocutor falls within the range of the parallactic angle.

The line-of-sight matching area where the image pickup unit is set is preferably at a position higher than the line of sight of the interlocutor to be picked up. Particularly, it was confirmed as a result of an experiment by the present inventor that the image pickup unit which shielded the monitor from the interlocutor was preferably set near the parietal portion of the person's image displayed on the monitor when viewed from the interlocutor.

To set the image pickup unit in an area (line-of-sight matching area) defined by the distance between the interlocutor and the monitor, which is specified by the position regulation means, and the predetermined parallactic angle for determining that the line of sight of the interlocutor matches the line of sight of the person's image displayed on the monitor, a first means for moving the image pickup unit itself to the area where the lines of sight between the interlocutor and the person's image on the monitor match, a second means for moving the interlocutor opposing the monitor to move the area where the lines of sight between the interlocutor and the person's image on the monitor match, thereby relatively changing the positions of the image pickup unit and the line-of-sight matching area, or a third means for moving the person's image on the monitor and similarly moving the area where the lines of sight between the interlocutor opposing the monitor and the person's image on the monitor (the third means can be effectively used as an algorithm for moving an image display area where the person's image is displayed on a screen split by a display control unit (to be described later)) can be used.

The first means can be realized by providing a processing unit for recognizing the position of the person's image on the monitor, which is displayed on the monitor, in the terminal equipment, and providing a driving mechanism for relatively moving the set position of the image pickup unit with respect to the person's image whose position is recognized by the processing unit in the image pickup apparatus. As an embodiment, the first means is provided in each terminal equipment. Alternatively, position recognition of the monitor image of the second interlocutor is performed by the processing unit of the first terminal equipment, and the processing unit transmits a predetermined control signal to the second terminal equipment, thereby remote-controlling the second terminal equipment from the first terminal equipment.

The second means can be realized by providing a processing unit for recognizing the position of the person's image on the monitor, which is displayed on the monitor, in the terminal equipment, and providing a mechanism for adjusting the line of sight of the interlocutor to be picked up with respect to the line of sight of the person's image whose position is recognized by the processing unit in the position regulation means. As an embodiment, the first means is provided in each terminal equipment. Alternatively, position recognition of the monitor image of the second interlocutor is performed by the processing unit of the first terminal equipment, and the processing unit transmits a predetermined control signal to the second terminal equipment, thereby remote-controlling the second terminal equipment from the first terminal equipment.

To realize the third means, the terminal equipment comprises a processing unit for adjusting the display position of the person's image displayed on the monitor. The processing unit specifies a reference point at a virtual position on the monitor image where the image pickup unit should be originally present, and subsequently, detects a shift of the person's image displayed on the monitor on the basis of coordinates on the monitor corresponding to the actual set position of the image pickup unit and coordinates of the obtained reference point on the monitor. If it is determined that the person's image shifts from the display position on the monitor where the person's image should be originally displayed, a vector starting from the coordinates of the reference point on the monitor and terminating at the coordinates on the monitor corresponding to the set position of the image pickup unit is calculated, and the shifting person's image is translated on the monitor. As an embodiment, this processing is performed for the monitor image of the interlocutor (initial setting before the start of an interactive operation) or for the monitor image of the second interlocutor. Particularly, when the display size of the person's image (the monitor image of the first interlocutor or the second interlocutor) is arbitrarily changed in a screen division operation (including enlargement/reduction of the person's image to be displayed) performed by a display control unit (to be described later), the area for displaying the image can be set at an arbitrary position on the monitor screen. Therefore, to match the lines of sight between the interlocutor and the person's image in a changed size, the third means can be particularly effectively used.

The display positions of both the eyes of the person's image on the monitor, which is received and displayed on the monitor, are detected, and a position separated upward from the center between the eyes by a predetermined distance (e.g., about 10 cm) on the monitor is defined as the reference point. Alternatively, the person's image received and displayed on the monitor may be binarized to detect the contour of the person's image, and the reference point may be specified at a position on the monitor corresponding to the parietal portion of the person's image.

The driving mechanism for moving the image pickup unit may adjust the angle of the image pickup direction of the image pickup unit on the basis of the position of the interlocutor, which is temporarily recognized by the processing unit, and the position of the image pickup unit. When the angle adjustment for the image pickup unit is performed by the driving mechanism, the image pickup direction of the image pickup unit is automatically set toward the line of sight of the interlocutor whose position is recognized by the processing unit. The driving mechanism for moving the image pickup unit may also have an arrangement such that average matching of the directions of lines of sight is detected, and if the moving speed in moving and aligning operations is a predetermined value or less, and the fluctuation in the direction of line of sight is within a predetermined range, the aligning operation is not performed (determination is performed by the processing unit or the like). When the image pickup unit is moved, an image output from the image pickup unit fluctuates. When the moving speed is limited, and the frequency of the moving operation is minimized, fluctuation for causing a sense of incompatibility can be prevented.

For the driving mechanism for moving the image pickup unit, a member positioned between the interlocutor and the display unit is preferably partially formed of a transparent material.

The position regulation means for regulating the position of the interlocutor includes a chair whose height is adjustable (a chair having a sitting height adjustment mechanism) separated from the display unit by a predetermined distance. A table provided between the interlocutor and the display unit also functions as the position regulation means. The system uses the position regulation means to separate the interlocutor to be picked up from the display unit by a distance of 0.5 m to 5 m. This is because, since the movement of the interlocutor in the left and right directions and in the back-and-forth directions can be sufficiently limited by the position regulation means, moving adjustment in the vertical direction, which is caused by a physical difference between interlocutors, is most effective to match the lines of sight between interlocutors in this system.

The image pickup unit adequate to this system may be arranged independently of the display unit, as shown in, e.g., FIG. 2. Alternatively, the image pickup unit may be attached to part of the display unit through the support mechanism, as shown in FIG. 7.

The two-way interactive system according to the present invention is oriented to a counseling system between interlocutors in remote areas. Therefore, to acquire useful counseling data or realize an ideal counseling environment, this system has various arrangements and functions.

For example, the display control unit for performing display control of the display unit has a function of enlarging or reducing an image to be displayed on the display unit. The display size largely influences on the mentality of an interlocutor. By freely setting the size of the image display area on the monitor by the display control unit, the degree of freedom of an interactive operation increases, and a comfortable interactive operation environment can be realized. The display position of a reduced person's image (monitor image) on the monitor is adjusted by the above-mentioned third means for matching the lines of sight. Therefore, the line-of-sight matching state between the first interlocutor and the second interlocutor is maintained.

Transmission information-may be character/graphic information in addition to image/voice information of an interlocutor. With this arrangement, the display unit can also display characters or graphics together with a person's image on the basis of character or graphic information received through the transmission means. That is, by displaying not only image/voice information but also character/graphic information, an interactive operation becomes smoother.

To display character/graphic information, the characters or graphics may overlap a displayed person's image. The monitor screen may be divided into an area for displaying characters or graphics and an area for displaying a person's image. As a preferable form of screen division, (1) the monitor screen is divided along the horizontal direction, and a person's image is displayed on the upper side, or (2) the monitor screen is divided along the vertical direction, and a person's image is displayed on one side or at the central portion. The present inventor confirmed that matching of the lines of sight between an interlocutor and a person's image did not degrade in both the forms (1) and (2). As an application of this form, a plurality of display units including a first monitor for displaying a person's image and a second monitor for displaying character/graphic information may be provided.

This system also has a character/graphic input device as a man-machine interface. With this arrangement, the display unit can display character/graphic information input from the character/graphic input device through a character/graphic input control unit. In addition, character information or graphic information received in this manner can be output to the terminal equipment on the partner side. The character/graphic input device may be provided to only one of the terminal equipments at the first and second points where interlocutors are present.

As described above, when this system has a character/graphic input device, an interactive operation using characters or graphics is enabled to make the interactive operation smoother. Such a character/graphic input device, a keyboard device, a pen input device (touch panel) arranged near at hand of an interlocutor can be employed. When both the keyboard device and the pen input device are provided and appropriate selected, a further smoother interactive operation can be realized. The character/graphic input device may have a pointing device for inputting a pointer position for indicating a displayed character or graphic. An object for an interactive operation at each point of time can be specified in accordance with position indication by a pointer. Use of the character/graphic input device to recognize an input voice of an interlocutor, convert the voice information into character information, and display the character information is effective to establish a smoother interactive operation (or counseling).

The two-way interactive system has speakers arranged near ears aside an interlocutor. Whispering into ears improves the intimacy. A headphone is typically used as such a voice output unit.

This system has a directional high-sensitive microphone as a voice input unit. A microphone used on a table or clipped at the breast can also be employed. However, a microphone on a table may cause conscious obstacles for an interactive operation. For a microphone at the breast, if the interlocutor carelessly leaves the seat, the cord may be damaged. Therefore, it is preferable that a directional high-sensitive microphone of which the interlocutor is unconscious be set above the display unit or incorporated in the display unit. Particularly, since the line of sight is already recognized, the directionality can be improved by setting the microphone toward the mouth.

A voice/acoustic data processing unit for receiving a voice signal from the voice input unit has a function of amplifying and adjusting voice input to control an input volume. The voice/acoustic data processing unit automatically adjusts the output volume of an input voice signal to a volume at a predetermined level. The voice/acoustic data processing unit may detect the average level of the input volume levels for a predetermined time, and perform automatic volume adjustment when the difference between the input volume and the average level exceeds a predetermined value.

At this time, the display unit displays the output volume in the voice/acoustic data processing unit (the volume of the interlocutor, which is output to the partner side). An unexperienced person cannot determine the voice volume when the person talks to another person on the screen without having a microphone in sight. Therefore, a smoother interactive operation can be realized by adjusting the volume of talk. In addition, when the output volume of the interlocutor is displayed on the monitor screen to cause the interlocutor to recognize the volume, the volume can be fed back to the interlocutor, so that the interlocutor can determine whether the output volume is appropriate for transmission.

A voice/acoustic output control unit for controlling the voice output unit has a function of outputting a background music (BGM) and detecting the interactive operation volume to adjust the output volume of the background music. The voice/acoustic output control unit detects that the interactive operation volume is substantially zero for a predetermined time, and, on the basis of the detection result, at least starts the background music or performs adjustment to increase or decrease the volume of the background music. The voice/acoustic output control unit may detect the volume of the voice of an interlocutor and adjust the volume of the background music not to impede listening to the voice of the interlocutor, thereby outputting a background music overlapping the voice of the partner interlocutor from the voice output unit to relax the interlocutor. Particularly, when silence continues, the tension of the interlocutor can be eased or the interlocutor can be calmed by starting a background music or changing the volume of the background music.

In the two-way interactive system, each terminal equipment has a printer for printing the display screen of the monitor, and a storage means for storing information on the display screen. The storage means is a card-shaped recording medium having at least an IC (integrated circuit), and an optical memory card, an IC card, an optical memory disk, or a magneto-optical disk can be used. Information during an interactive operation, and particularly, character or graphic information used during an interactive operation can be stored.

To maintain the security of this system, each image pickup apparatus preferably has a person authentication unit for performing person authentication of an interlocutor. When an interactive operation is started after person authentication, the security of this system can be sufficiently maintained. The person authentication unit may use a dedicated read device to read authentication data from a recording medium in which the authentication data is written, and perform person authentication on the basis of the read result. The recording medium includes a card-shaped recording medium having at least an IC, and an optical memory card, an IC card, or a magnetic card can be used. The person authentication unit may (1) perform person authentication on the basis of the analysis result of the face of an interlocutor, (2) perform person authentication on the basis of the voice analysis result of the voice of an interlocutor, (3) perform person authentication on the basis of the character analysis result of the signature of an interlocutor, or (4) perform person authentication on the basis of the text analysis result of the message text of an interlocutor. With this person authentication, the interlocutor can be specified. The authentication method is preferably selected in accordance with confidential contents. The text analysis of the message text means collation analysis between the database or cipher database of a designated person and characters for, e.g., X and Y in a text "X is Y."

The card-shaped external recording medium such as an IC card may also be used to reserve an interactive operation, authenticate the designated partner interlocutor, or authenticate and control interactive operation conditions including a reserved interactive operation start time and an interactive operation time set in advance. The recording medium can also be used as an electronic fee settlement means. By using the recording medium to record the summary of an interactive operation or pending questions, these pieces of information can be conveniently used in next counseling or communication. When data such as the interactive operation start time or a partner for an interactive operation (an interlocutor on the partner side) is input in advance to the recording medium such as an IC card, the partner-side terminal equipment can be searched on a network such as a BBS on the basis of the data. On the basis of the search result, terminal equipments at first and second specific points can be line-connected independently of the present positions of the first interlocutor and the second interlocutor, so that an interactive operation environment between the first and second interlocutors can be formed. When the name, face (image data), and interactive operation items (theme of an interactive operation) of an interlocutor on the partner side are input to the recording medium (e.g., an IC card), and these pieces of information are displayed for the interlocutor on the monitor for predetermined period (e.g., about 30 seconds) before an interactive operation is started, the interlocutor can mentally prepare for the interactive operation, so the interlocutor can easily shift to the theme of the interactive operation. At this time, if a BGM or voice is output in an interlocked manner, a more comfortable interactive operation environment can be provided for the interlocutor. Such monitor display can also be effectively performed during and/or after the interactive operation as needed. Particularly, when monitor display is performed after the interactive operation is completed, the interlocutor can smoothly progress settlement of the interactive operation and the like (the time of monitor display after completion of the interactive operation corresponds is a mental preparation time from completion of the interactive operation to the next operation for the interlocutor).

The table serving as the position regulation means is set between the interlocutor and the display unit while one end opposes the interlocutor, and the other end substantially contacts the display unit. The table may be set such as (1) when the interlocutor is sitting on the chair, the upper half of the body is above the table, or (2) when the interlocutor is standing, the upper half of the body is above the table. With this arrangement, since a sense of continuity is generated through the table, a feeling of uneasiness caused when the relative distance to the partner (mental distance) is lost can be reduced. In this case, the display unit and the table preferably contact each other. However, a mentally negligible gap (e.g., several tens cm or less) may be present.

In this two-way interactive system, the terminal equipment has an interactive operation processing unit for performing statistical analysis processing of the interactive operation time of the interlocutor. The interactive operation processing unit may count the total interactive operation time, the average interactive operation time, and the number of interactive operations, and display the total interactive operation time, the average interactive operation time, the number of interactive operations, and the distribution of the number of interactive operations on the display unit. The voice/acoustic data processing unit performs statistical analysis processing of the voice spectrum of an interlocutor, of a voice spectrum according to transmitted voice information. This statistical analysis processing means that the voice spectrum of an interlocutor, or a voice spectrum according to transmitted voice information is analyzed with time to detect an average spectrum and a voice spectrum changed beyond a predetermined value.

Each terminal equipment of this system has an interactive operation processing unit for detecting a predetermined terms used by an interlocutor, or a predetermined term in a voice according to transmitted voice information. The terminal equipment may also have a position change analysis means for analyzing the moving track, the moving change amount, the moving speed, or the moving acceleration of the head, the upper half of the body, or a hand of an interlocutor or transmitted person's image (this analysis is performed by the processing unit or the like).

In counseling or the like, when interactive operation situation analysis such as interactive operation time analysis, voice spectrum analysis, predetermined term analysis, or body action analysis is performed, the interactive operation situation can be quantified.

In the transmission means of the two-way interactive system, a plurality of independent transmission lines are ensured between the first point and the remote second point. At least one of the plurality of transmission lines is a voice transmission line for transmitting voice information. The transmission means includes a network such as a conventional telephone network, and also includes a BBS (Bulletin Board System) having various databases. This system also has a backup system for detecting a failure in transmission line in use for an interactive operation and switching the transmission line to be used. Therefore, if a transmission line fails during an interactive operation, another transmission line can be used to continue the interactive operation. In this case, another transmission line preferably ensures at least transmission of voice information. Generally, a possible cause for a line abnormality is an abnormality in a coaxial cable, an optical fiber cable, or a transmission unit. Therefore, another transmission line is preferably a radio system.

DESCRIPTION OF THE PREFERRED EMBODIMENTS

An embodiment of a two-way interactive system according to the present invention will be described below with reference to FIGS. 1 to 24.

Figure 1:
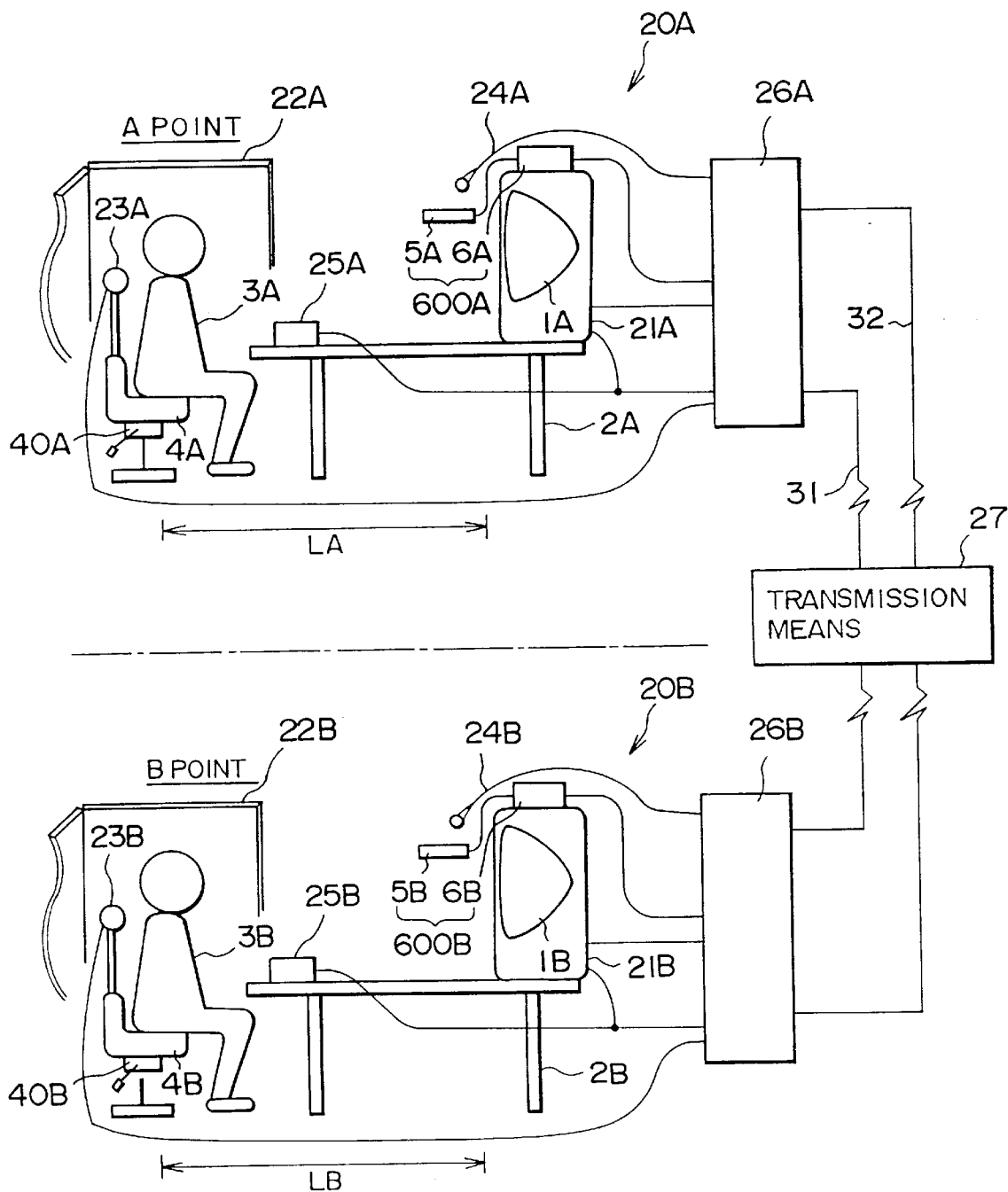
FIG. 1 is a logical diagram showing the entire two-way interactive system according to the present invention.

FIG. 1 is a logical diagram showing the entire two-way interactive system according to the present invention. This system realizes a two-way interactive operation between an interlocutor 3A (first interlocutor) at a point A (first point) and an interlocutor 3B (second interlocutor) at a point B (second point). Particularly, this system is oriented to a counseling system for establishing an intimate reliability relationship between interlocutors in remote areas and realizing close communication, so that at least one of the interlocutors is assumed to be a counselor such as a teacher, a doctor, or a psychologist. Therefore, this system has various functions and arrangements for providing information necessary for counseling and ideal counseling environment to the counselor.

At the point A, (a) a chair 4A on which the interlocutor 3A (e.g., a counselor) sits, (b) a table 2A at which the interlocutor 3A sits, and (c) a terminal equipment 20A having a mechanism for matching the lines of sight between the interlocutors through a transmission means 27 are set. At the point B, (a) a chair 4B on which the interlocutor 3B (e.g., a client as a counselee) sits, (b) a table 2B at which the interlocutor 3B sits, and (c) a terminal equipment 20B having a mechanism for matching the lines of sight between the interlocutors through the transmission means 27 are set. The transmission means 27 includes an optical fiber transmission line 31 (main transmission line) which enables mass transmission and a satellite communication transmission line 32 (backup transmission line), so that transmission/reception of image information and voice information between the terminal equipment 20A at the point A and the terminal equipment 20B at the point B is enabled. The transmission means 27 can be either a wired system or a radio system. In addition, the transmission means includes a network such as a conventional telephone network, and also includes a BBS (Bulletin Board System) having various databases.

At the point A, the chair 4A functions to regulate the position of the interlocutor 3A. The chair 4A is preferably fixed to maintain a predetermined distance to a display unit 21A of the terminal equipment 20A. However, even when the chair 4A is not fixed, a predetermined distance can be maintained between the chair 4A and the display unit 21A by setting the table 2A between the interlocutor 3A and the display unit 21A (a fact was confirmed as a result of an experiment by the present inventor that the presence of the table 2A provided a reference for a mental distance to the interlocutor 3A). The terminal equipment 20B at the point B where the partner interlocutor 3B (e.g., a counselee) is present has the same arrangement as described above.

At the point A, the terminal equipment 20A has (1) the display unit 21A having a monitor TV 1A and arranged on the table 2A to display the image of the interlocutor 3B on the basis of image information transmitted from the terminal equipment 20B at the point B through the transmission means 27, (2) an image pickup unit 6A for receiving the image of the interlocutor 3A, which is picked up by a CCD camera 5A, as image information and transmitting the image information to the terminal equipment 20B at the point B, (3) a voice output unit 23A (speakers) for outputting the voice of the interlocutor 3B on the basis of voice information transmitted from the terminal equipment 20B at the point B through the transmission means 27, and (4) a voice input unit 24A (microphone) for inputting the voice of the interlocutor 3A as voice information and transmitting the voice information to the terminal equipment 20B at the point B. To realize close communication as a counseling system, this system also has (5) a character/graphic input unit 25A (an interface such as a keyboard, a pointing device, or a touch panel), used by the interlocutor 3A to input characters or graphics, display the input characters or graphics on the display unit 21A, and transmit the characters or graphics to the terminal equipment 20B at the point B as character/graphic information, and (6) a processing unit 26 arranged between the above constituent elements and the transmission means 27 to perform signal processing and transmission control. The terminal equipment 20B at the point B has the same arrangement as that of the terminal equipment 20A at the point A.

The arrangement of an image pickup apparatus 600A or 600B of the terminal equipment 20A or 20B at the point A or B will be described below. For the descriptive convenience, a constituent element common to the terminal equipments 20A and 20B at the points A and B will be referred to as, e.g., an image pickup apparatus 600 by omitting suffixes A and B which are added to discriminate between the two points. A description of the terminal equipment 20A at the point A will be made below in principle unless otherwise specified, and a description of the terminal equipment 20B with a common arrangement at the point B will be omitted.

Figure 2:
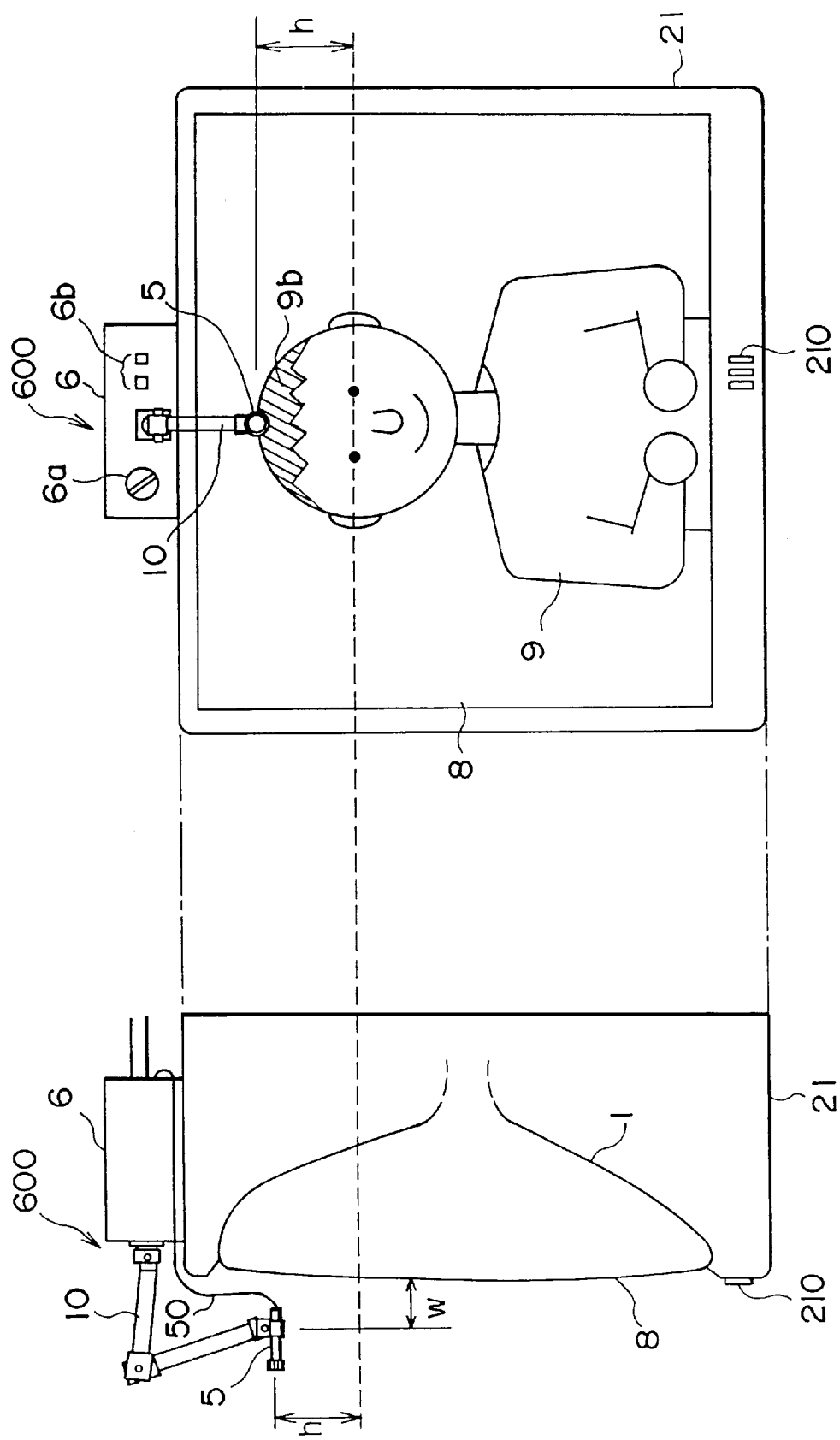
FIG. 2 is a view showing an image pickup apparatus in FIG. 1 so as to explain a method of setting a CCD camera (image pickup unit) at a predetermined position.

The image pickup apparatus 600 has a micro CCD camera 5 (5A) serving as an image pickup unit, a support mechanism 10 (the first embodiment is shown in FIG. 2) for setting the micro CCD camera 5 at a predetermined position while supporting the micro CCD camera 5, and an image pickup unit 6 (6A) for controlling the CCD camera 5. A monitor TV 1 (1A) is placed on a table 2 (2A), and an interlocutor 3 (3A) is sitting on a chair 4 (4A) having a height adjustment mechanism 40 (40A) separated from the monitor TV 1 by a distance L (m). The distance L (LA) is set to fall within the range of 0.5 m to 5 m. The cylindrical micro CCD camera 5 having an outer diameter Φ of 20 mm or less and a length of about 100 mm is arranged between the interlocutor 3 to be picked up and the monitor TV 1. The CCD camera 5 is set while its image pickup direction is set toward the interlocutor 3 to be picked up. The image of the interlocutor 3, which is picked up by the camera 5, is transmitted from the image pickup unit 6 to the partner interlocutor as image information (transmitted to the terminal equipment 20B at the point B through the transmission means 27). Depending on the interlocutor, the distance between a display unit 21 and the interlocutor may slightly change. Therefore, to cope with such a situation, a device with a large focal depth is preferably selected as the CCD camera 5.

The detailed set position of the micro CCD camera 5 will be described below with reference to FIG. 2.

The image pickup unit 6 of the image pickup apparatus 600 is set on the display unit 21 for displaying the transmitted image of the partner interlocutor. The image pickup unit 6 main body has various control switches 6b in addition to a change-over switch 6a for selecting display of the image of the interlocutor, which is picked up by the camera 5 (received by the image pickup unit 6 through a camera cable 50) or display of the transmitted image of the partner interlocutor 3B. Switches 210 include a power switch for turning on/off the power supply of the monitor TV 1, and the like. The CCD camera 5 is set through the support mechanism 10 (robot arm) at a predetermined position in front of a monitor screen 8 on which a transmitted image 9 of the partner interlocutor 3B is displayed. The monitor screen 8 has a size of about 4 inches to 40 inches.

More specifically, the CCD camera 5 is arranged near a head portion 9a of the interlocutor's image 9 displayed on the monitor screen 8 and at a position separated forward from the monitor screen 8 by a distance w (cm). The central axis of the cylindrical CCD camera 5 is separated by a distance h (cm) above from the eye position of the interlocutor's image 9, which is indicated by a dotted line.

Since the micro CCD camera 5 is positioned near the head portion above the eye position of the interlocutor's image 9 displayed on the screen 8 of the wide monitor TV 1, no particular obstacle occurs in a two-way interactive operation. For example, in a system configuration in which the CCD camera 5 is arranged about 10 (cm) (=h) above the eye position (indicated by a dotted line) of the interlocutor's image 9 displayed on the screen 8, and the distance L between the monitor TV 1 and the interlocutor 3 is set at about 2.5 (m), the parallactic angle is 2.3° which is much smaller than the detection limit of 3° (even when the distance w between the monitor screen 8 and the CCD camera 5 is about 10 (cm), variations in parallactic angle are not particularly influenced). That is, the present inventor confirmed as a result of an experiment that, when the eyes of the partner (the eyes of the image of the partner interlocutor 3B, which is displayed on the monitor screen 8) are clearly in sight in the line-of-sight matching state, and the screen 8 of the monitor TV 1 is large, no obstacle is generated in the two-way interactive operation even if the micro camera 5 is arranged near the hear portion. As a result of an experiment, it was confirmed that a satisfactory two-way interactive operation could be realized when the size or the screen 8 was about 35 cm (width)×26 cm (height) or more. If the interlocutors are acquaintances, mental obstacles tend to decrease even with a small screen. Therefore, the screen size can be appropriately selected in accordance with the application purpose.

Figure 3:
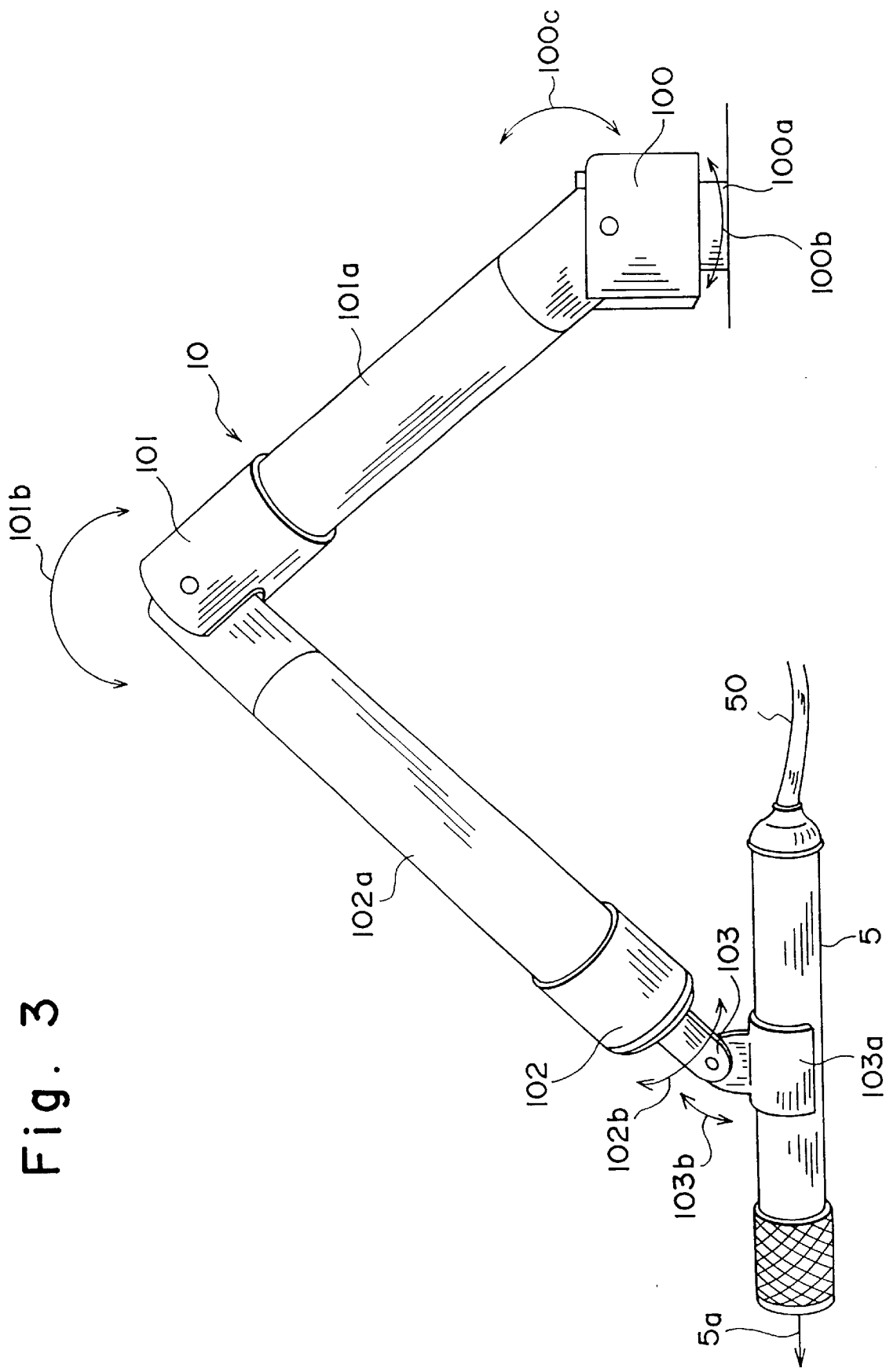
FIG. 3 is a view showing the first embodiment of a support mechanism of the image pickup apparatus in FIG. 1, in which a structure for setting the CCD camera at the predetermined position is shown.

The structure of the robot arm, i.e., the camera support mechanism 10 of the image pickup apparatus 600 in FIG. 1 will be described below with reference to FIG. 3.

This robot arm is constituted by a first rod 101a, a second rod 102a, and a holder portion 103a for gripping the camera 5. The image pickup unit 6 main body and the first rod 101a are rotatably connected through a first joint portion 100. The first rod 101a and the second rod 102a are rotatably connected through a second joint portion 101. The second rod 102a and the holder portion 103a are rotatably connected through a third joint portion 102. Particularly, the third joint portion 102 has a projecting portion 103 directly rotatably connected to the holder portion 103a so that special rotation is enabled. The first joint portion 100 can rotate in a direction indicated by an arrow 100b and also allows the first rod 101a to move in a direction indicated by an arrow 100c. The second joint portion 101 supports the second rod 102a and also allows the second rod 102a to move in a direction indicated by an arrow 101b. The third joint portion 102 allows the projecting portion 103 to move in a direction indicated by an arrow 102b. The angle between the projecting portion 103 and the holder portion 103a can be changed in a direction indicated by an arrow 103b. The above structure of the robot arm (the first embodiment of the support mechanism) allows the camera 5 to be set at a desired position and also enables angle adjustment for the camera 5. Therefore, the set position and an image pickup direction 5a of the camera 5 can be freely set using the robot arm.

The structure of an image pickup apparatus 601 having another support mechanism (second embodiment) will be described below as an application of the image pickup apparatus 600 with reference to FIGS. 4 to 6.

The camera support mechanism of this image pickup apparatus is preferably formed of an inexpensive transparent material such as a transparent thread or tape or a transparent glass or acrylic plate because a monitor on which the image of an interlocutor 3B is displayed is arranged in front of a screen 8. This is because display on the monitor screen 8 is not impeded.

Figure 4:
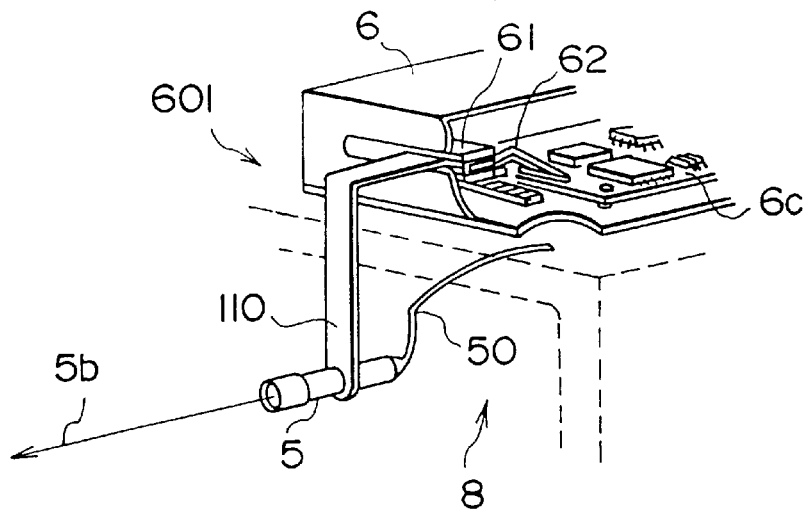
FIG. 4 is a view showing the second embodiment of the support mechanism of the image pickup apparatus in FIG. 1, in which a structure for setting the CCD camera at the predetermined position is shown.

The image pickup apparatus 601 shown in FIG. 4 has a support member 110 for supporting a CCD camera 5 fixed at its one end and setting the CCD camera at a predetermined position in front of the monitor screen 8, and a base portion 61 for gripping the other end of the transparent support member 110 to support the entire the transparent support member 110. Particularly, the base portion 61 is accommodated in an image pickup unit 6 of the image pickup apparatus 601, and a circuit board 6c for realizing the function of a data processing unit and the like is also accommodated in the image pickup unit 6. In FIG. 4, reference numeral 62 denote a plurality of wires (ribbon) for transmitting an electrical signal for driving and controlling the base portion 61 from a circuit board 60 to a driving mechanism (FIGS. 5 and 6), thereby moving the set position of the CCD camera 5.

Figure 5:
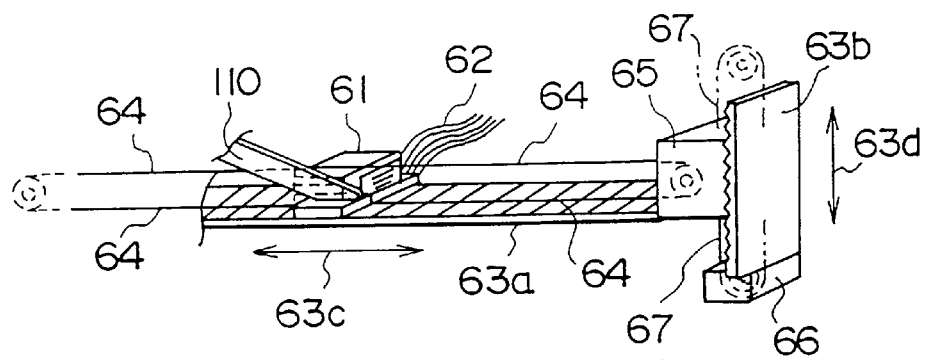
FIG. 5 is a view showing the structure of a camera moving mechanism of the support mechanism shown in FIG. 4 (second embodiment), which mechanism particularly moves the CCD camera in the horizontal and vertical directions.

Movement of the CCD camera 5 in the horizontal and vertical directions is realized by the mechanism shown in FIG. 5. The base portion 61 for supporting the transparent support member 110 is set on a first moving table 63a, and the position of the base portion 61 in the horizontal direction is regulated by a wire 64. Therefore, when a first motor 65 pulls the wire 64 in any direction, the base portion 61 moves in a direction indicated by an arrow 63c. The first moving table 63a is set on a second moving table 63b, together with the first motor 65, and the position of the first moving table in the vertical direction is regulated by a wire 67. Therefore, when a second motor 66 pulls the wire 67 in a direction, the entire first moving table 63a including the first motor 65 moves in a direction indicated by an arrow 63d.

Figure 6:
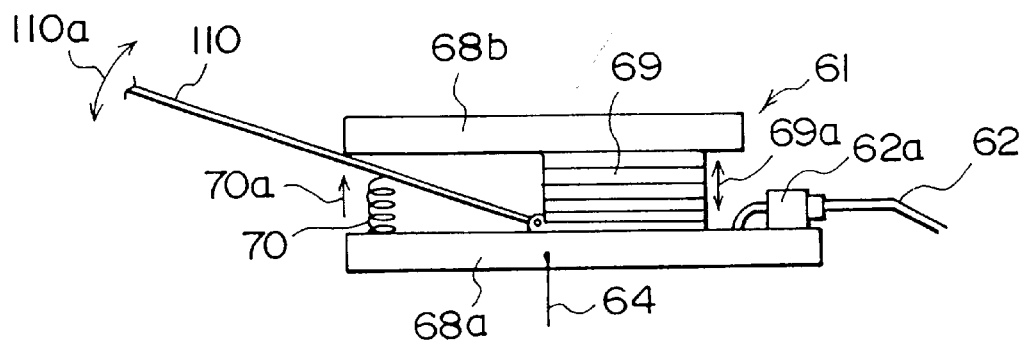
FIG. 6 is a view showing the structure of an angle adjustment mechanism of the support mechanism shown in FIG. 4 (second embodiment), which mechanism particularly changes the image pickup direction of the CCD camera.
Figure 7:
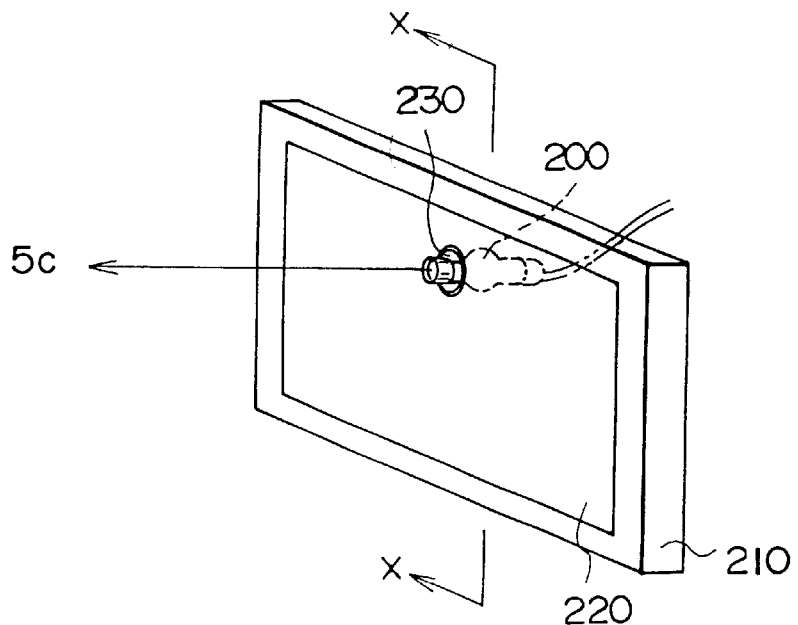
FIG. 7 is a view showing the second embodiment of a terminal equipment in the two-way interactive system whose support mechanism (third embodiment) for setting the CCD camera at a predetermined position has a structure wherein the CCD camera is attached to a display unit.

Angle adjustment for the CCD camera 5 is realized by a mechanism shown in FIG. 6. The base portion 61 is constituted by a pair of plate members 68a and 68b and an interval adjustment portion 69 for regulating the interval between these plate members. The transparent support member 110 is pressed up by a spring member 70 in a direction indicated by an arrow 70a. With this arrangement, the interval adjustment portion 69 adjusts the interval between the plate members 68a and 68b in a direction indicated by an arrow 69a in accordance with a control signal (electrical signal) output from the circuit board 60 through the wires 62 connected through a connector 62a. With this operation, the angle of the transparent support member 110 is adjusted in a direction indicated by an arrow 110a. In other words, by adjusting the angle of the transparent support member 110 in the direction indicated by the arrow 110a, the angle of an image pickup direction 5b of the CCD camera 5 can be changed.

A display unit 21 can employ a plasma display device or a liquid crystal display device in place of the monitor TV. When such a display apparatus is to be used, a CCD camera 200 is preferably incorporated in a housing 210 of the display apparatus in advance. The display apparatus shown in FIG. 7 has a through hole 230 at a predetermined position of a monitor screen 220 supported by the housing 210. The distal end portion of the CCD camera 200 directly extends through the through hole 230 and is positioned in front of the monitor screen 220.

Figure 8:
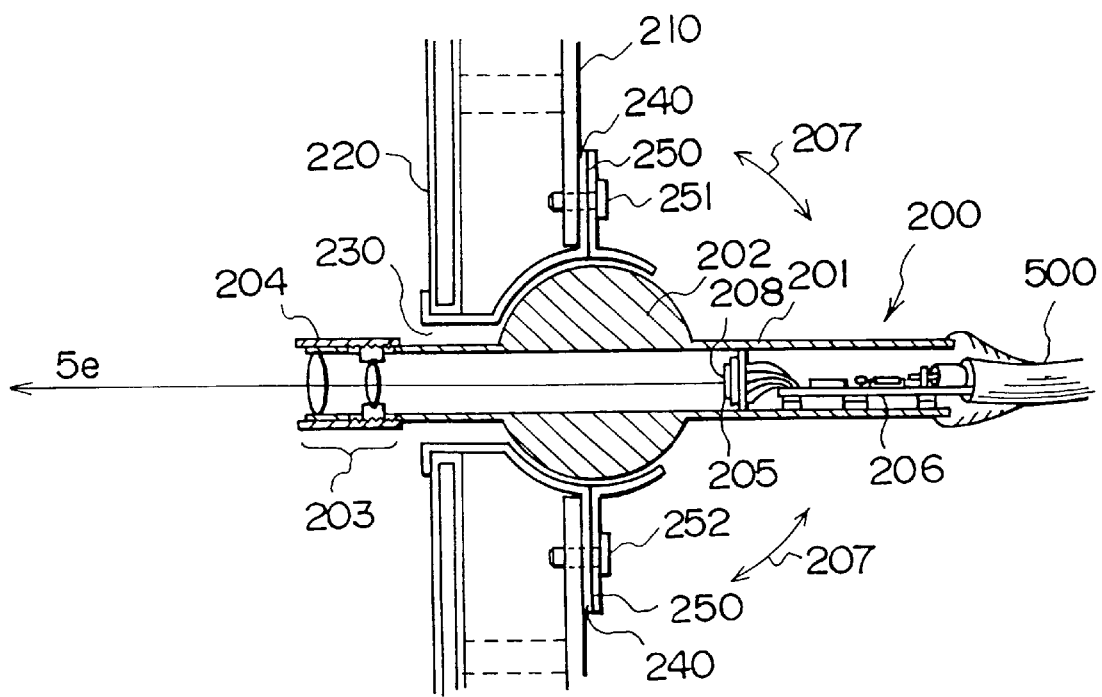
FIG. 8 is a sectional view showing the CCD camera attachment structure of the support mechanism shown in FIG. 7 (third embodiment), taken along a line X—X in FIG. 7.

The detailed structure is shown in FIG. 8. FIG. 8 is a sectional view of the display apparatus, taken along a line X—X in FIG. 7. As shown in FIG. 8, a lens barrel 201 of the CCD camera 200 has a spherical projecting portion 202 so that the CCD camera 200 can be attached to the housing 210. An image pickup device 205 and an imaging optical system 203 are incorporated in the lens barrel 201. An electrical signal detected by the image pickup device 205 is sent from an electronic circuit portion 206 to an external data processing unit through a camera cable 500. The lens barrel 201 has a structure for allowing at least one of lenses constituting the imaging optical system 203 to move in the axial direction of the lens barrel 201. Focusing of the CCD camera 200 is performed using an adjustment knob 204.

In the two-way interactive system according to the present invention, the camera 200 serving as an image pickup unit is perpendicular to a photoelectric conversion surface 208 of the image pickup device 205, so that an angle formed between a line 5e passing through the photoelectric conversion surface 208 and the 3 interlocutor falls within the range of the above-described parallactic angle. The line segment 5e substantially matches the image pickup direction of the camera 200. The camera 200 attached to the display unit moves the axis of the lens barrel 201 (the axis matches the line segment 5e) in a direction indicated by an arrow 207, thereby changing the image pickup direction of the camera 200 (the image pickup direction matches the line segment 5e).

Figure 9:
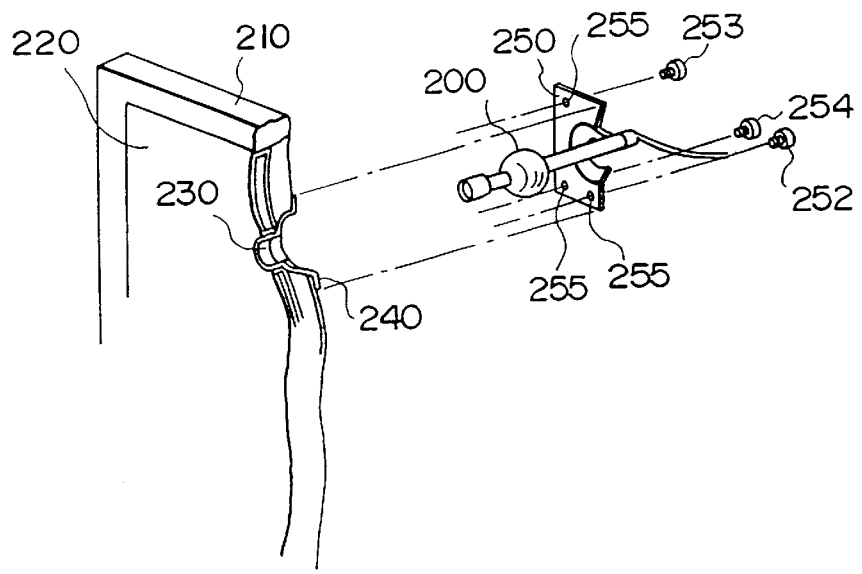
FIG. 9 is a perspective view showing the steps of assembling the support mechanism shown in FIG. 7 (third embodiment)

When grip members 240 and 250 directly attached to the housing 210 grip the projecting portion 202 of the CCD camera 5, the CCD camera 5 having the above structure is attached. Since the projecting portion 202 of the lens barrel 201 is spherical, the angle of the CCD camera 200 can be freely changed, so that an image pickup direction 5c of the CCD camera 200 can be set in a desired direction. FIG. 9 is a view showing the assembly steps for realizing the structure shown in FIG. 8. Referring to FIG. 9, the grip members 240 and 250 are fixed with bolts 252 to 254. Reference numeral 255 denotes a through hole which is formed in the grip member 250 to receive a bolt.

Figure 10:
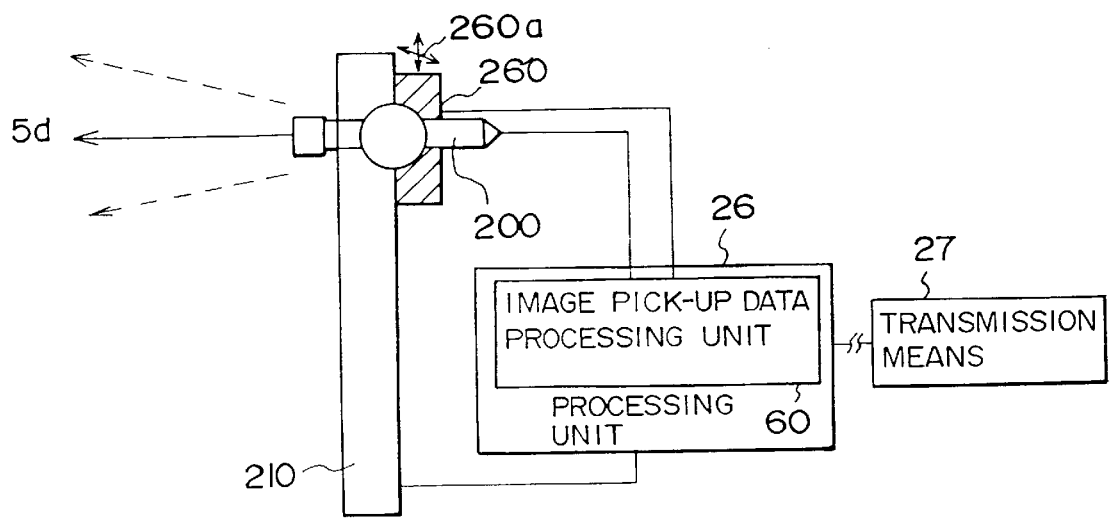
FIG. 10 is a view showing a structure for adjusting the position and image pickup direction of the CCD camera as an application of the support mechanism shown in FIG. 7 (third embodiment)

FIG. 10 is a view showing a terminal equipment having the CCD camera 5 and a display unit, which are integrally formed. The terminal equipment in FIG. 10 has a camera driving mechanism 260 for driving the CCD camera 200 in directions indicated by arrows 260a (in the vertical and horizontal directions). With this camera driving mechanism 260, an image pickup direction 5d of the CCD camera 200 can be changed in a direction indicated by a dotted line in FIG. 10. An image picked up by the CCD camera 200 is received by an image pickup data processing unit 60 and sent to a partner terminal equipment 20B (point B) through a transmission means 27. In this embodiment, the camera driving mechanism 260 is controlled by the image pickup data processing unit 60. In this embodiment, the image pickup data processing unit 60 is arranged in a processing unit 26. However, the image pickup data processing unit 60 may be independently arranged, as shown in FIG. 1.

Figure 11:
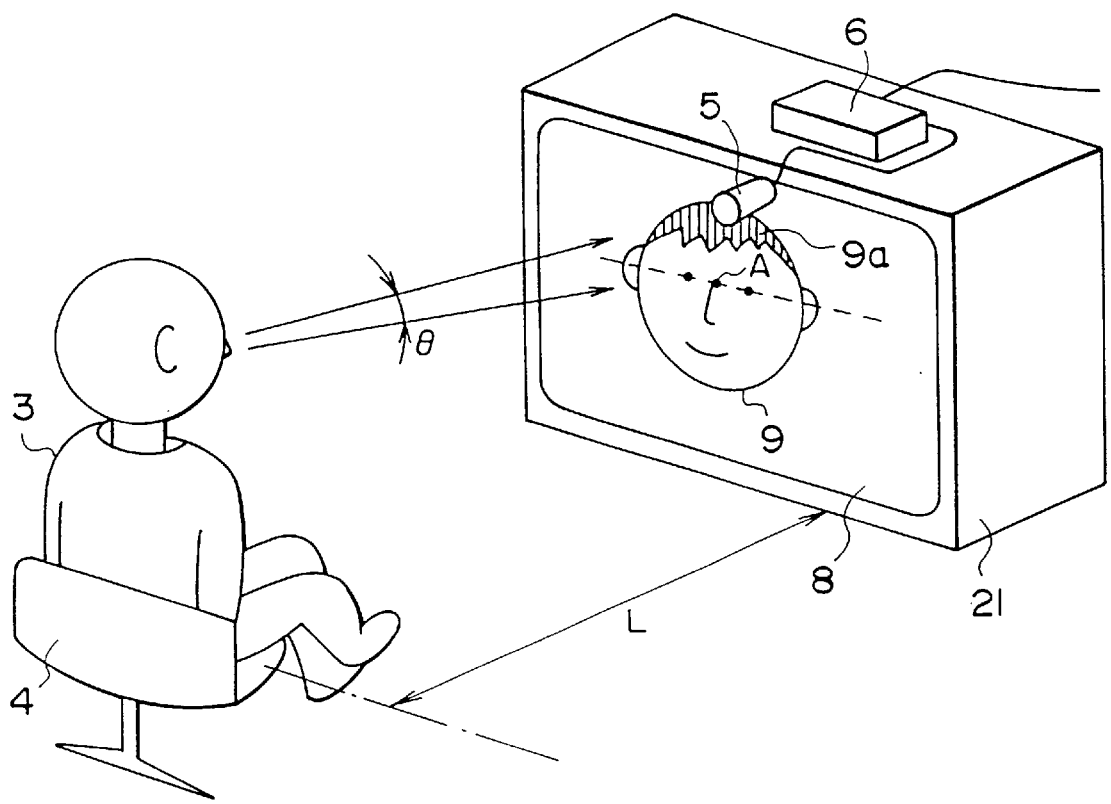
FIG. 11 is a view for explaining a parallactic angle.
Figure 12:
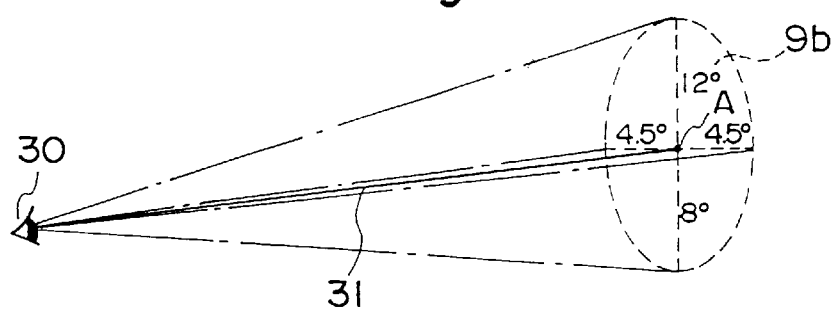
FIG. 12 is a view showing an area where the CCD camera should be set.

The parallactic angle will be described below with reference to FIG. 11. In this specification, the parallactic angle means an angle θ formed by the line of sight of the interlocutor 3 to be picked up, which is directed to the image 9 displayed on the monitor screen 8, and the line of sight of the interlocutor 3, which is directed to the CCD camera 5, as shown in FIG. 11. In other words, the parallactic angle means the shift angle of the set position of the CCD camera 5 with respect to the line of sight of the interlocutor 3. Matching of lines of sight means that the parallactic angle is within an allowance for unnaturalness caused by the set position of the CCD camera 5, as has been reported in Joint Meeting of Four Electric Institutes, 1967 (No. 1998). Quantitatively, the line-of-sight matching area is defined as a parallactic angle of 4.5° or less in the horizontal direction (on both the temple sides of the image 9 with respect to a center A of the eyes of the image 9), 12° or less in the upper direction (on a head portion 9b side of the image 9 with respect to the image center A), and 8° or less in the lower direction (on the body side of the image 9 with respect to the image center A). This parallactic angle is preferably as small as possible, as a matter of course, and the detection limit is 3° or less in the horizontal and vertical directions. Therefore, an area where the CCD camera 5 can be set is a conical area shown in FIG. 12. This conical area is regulated by the position of an eye 30 of the interlocutor 3 and a line-of-sight matching area 9b on the monitor screen 8 separated by a predetermined distance L (m), with respect to a line of sight 31 of the interlocutor 3 between the eye 30 of the interlocutor 3 and the central point A (in this embodiment, the center between the two eyes of the image 9 is defined as the central point A of the image 9) of the image 9 displayed on the monitor screen 8.

The following three means can be used to set the CCD camera 5 in a predetermined area with respect to the eye position (e.g., the image center A) of the image 9 of the interlocutor 3B at the point B, which is displayed on the monitor screen 8, e.g., at a position about 10 cm above the eye position of the image 9.

The first means moves the CCD camera 5 itself with respect to the monitor screen 8. To realize the first means, the image pickup unit 6 has the image pickup data processing unit 60 (for example, as shown in FIG. 10) for performing image recognition processing of the position of the image 9 of the interlocutor 3 (either the interlocutor 3A at the point A or the interlocutor 3B at the point B) in the monitor screen 8, which is displayed on the monitor screen 8, and a driving mechanism for moving the CCD camera 5 (e.g., the robot arm shown in FIG. 3, and the mechanisms shown in FIGS. 5, 6, and 8), so that the CCD camera 5 is set in the predetermined area of the monitor screen 8 with respect to the position-recognized image 9.

The second means moves the interlocutor 3 to be picked up with respect to the monitor screen 8. The second means can be realized by causing the image pickup data processing unit 60 to perform image recognition processing of the position of the image 9 of the interlocutor 3 in the monitor screen 8, which is displayed on the monitor screen 8, and arranging a person's position regulation means for adjusting the position of the interlocutor 3 to be picked up with respect to the position-recognized image 9 of the interlocutor 3. As the person's position regulation means, e.g., the chair 4 on which the interlocutor 3 sits is preferably used. The sitting height of an interlocutor can be adjusted by controlling a sitting height adjustment mechanism 40 provided to the chair 4. Since the set position of the chair 4 (the distance from the monitor screen 8, and the like) is fixed in advance, position adjustment in the horizontal direction with respect to the interlocutor 3 is unnecessary after the interlocutor 3 has sat on the chair 4. More specifically, only one indefinite element for determination of the position of an interlocutor is a shift in the vertical direction, which is caused by the physical difference between interlocutors. Therefore, when sitting height adjustment is performed for individual interlocutors, the second means can be sufficiently realized.

The third means moves the image 9 of the interlocutor 3 (either the interlocutor 3A at the point A or the interlocutor 3B at the point B) displayed on the monitor screen 8 relatively with respect to the CCD camera 5 with its set position fixed in advance. For the third means, the position of the image 9 in the monitor screen 8 must be recognized by the image pickup data processing unit 60 arranged in the image pickup unit 6, and the display position of the image 9 must be moved, as in the above-described means. With this means, the CCD camera 5 can be relatively set in the above predetermined area.

Figure 13:
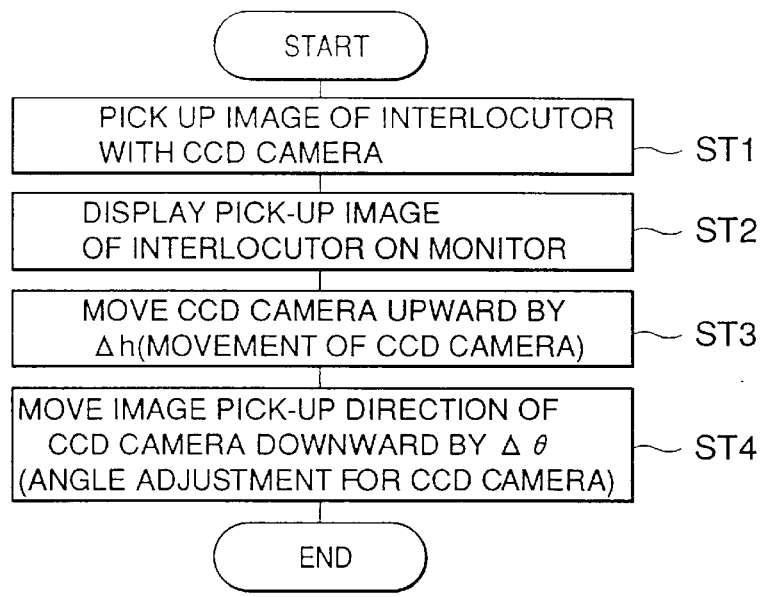
FIG. 13 is a flow chart for explaining the initial setting operation of the CCD camera.
Figure 15:
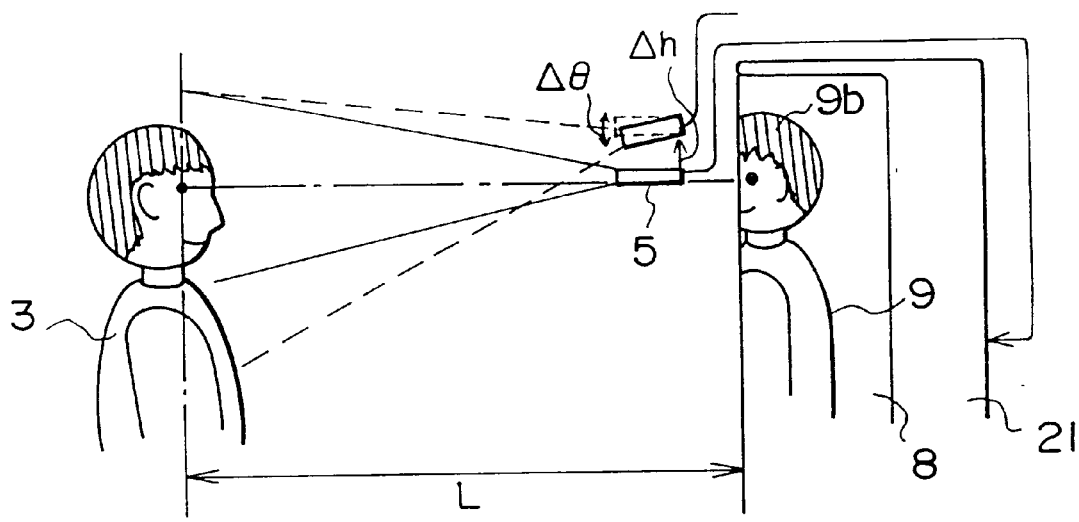
FIG. 15 is a view for explaining the initial setting operation of the CCD camera, which is explained by the flow chart shown in FIG. 13.

The initial setting operation (the initial setting operation for matching the lines of sight) of the CCD camera 5 will be described below with reference to a flow chart in FIG. 13. FIG. 15 is a view for explaining this setting operation.

The interlocutor 3 causes the CCD camera 5 to pick up the interlocutor 3 (step ST1), and causes the monitor screen 8 of the display unit to display the image 9 picked up by the CCD camera 5 (step ST2). If the set position of the CCD camera 5 matches the line of sight (the line connecting the eyes of the interlocutor and the central point A of the image) of the interlocutor 3 (i.e., if the parallactic angel is 0°), the presence of the CCD camera 5 becomes an obstacle for an interactive operation.

The CCD camera 5 is moved upward by Δh (step ST3) and newly set in an allowance area for matching the lines of sight (e.g., the area shown in FIG. 12) at a position not to cause an obstacle for the interactive operation. More specifically, the CCD camera 5 is set to overlap the head portion 9b of the image 9 when viewed from the interlocutor 3.

When the set position of the CCD camera 5 is moved by Δh, the image pickup direction of the CCD camera 5 is offset from the actual interlocutor 3. Therefore, the set angle of the CCD camera 5 is corrected downward by Δθ in accordance with the movement of the CCD camera 5 (step ST4). In this manner, the set position and set angle of the CCD camera 5 are adjusted in advance such that the parallactic angle which is determined by the relationship between the moving amount Δh and the distance L between the interlocutor 3 and the monitor screen 8 becomes 3° or less, thereby maintaining the line-of-sight matching state.

More specifically, if the interlocutor 3 is a short child, it is preferable that the sitting height of the child be adjusted by the sitting height adjustment mechanism 40 of the chair 4, the angle of the CCD camera 5 be corrected downward, and the image 9 itself displayed on the monitor screen 8 be moved.

Figure 14:
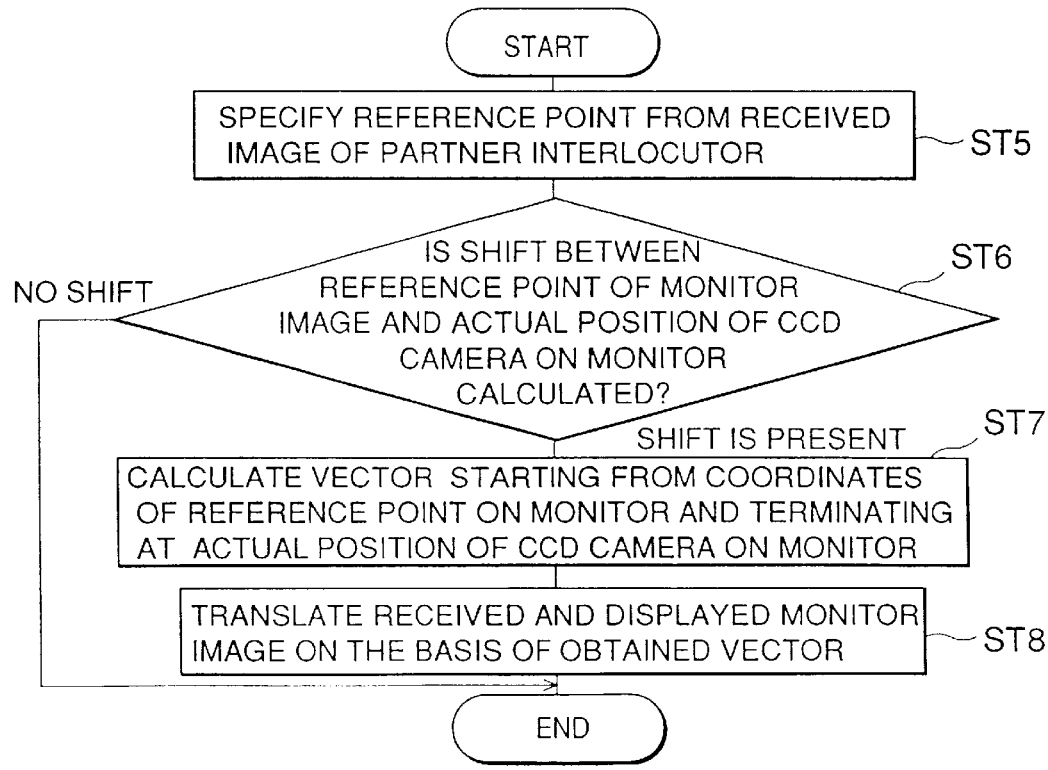
FIG. 14 is a flow chart for explaining an operation for moving an image displayed on a monitor such that the lines of sight between interlocutors match each other.
Figure 16:
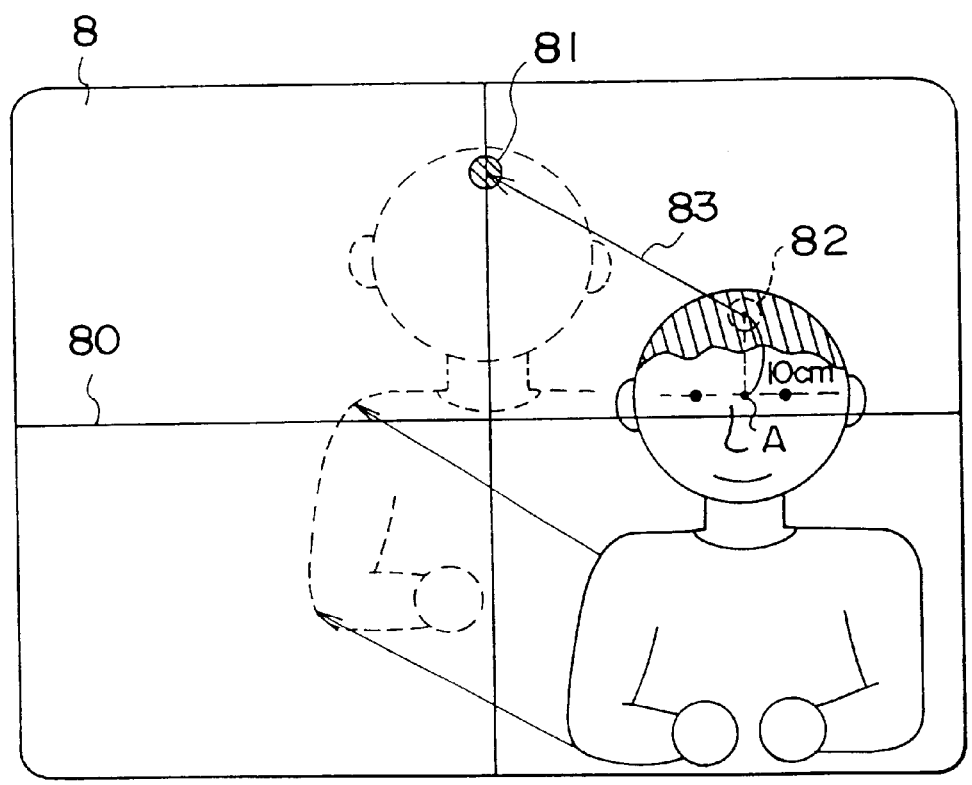
FIG. 16 is a view for explaining the operation for moving the image displayed on the monitor, which is explained by the flow chart shown in FIG. 13.

An operation for moving the image 9 of the interlocutor 3 (either the interlocutor 3A at the point A or the interlocutor 3B at the point B) displayed on the monitor screen 8 will be described below with reference to a flow chart in FIG. 14. FIG. 16 is a view for explaining this image moving processing. This image moving processing is performed by the image pickup data processing unit 60 or the processing unit 26 (display control unit 285) in the image pickup unit 6.

A reference point is specified from the received image 9 of the partner interlocutor or the image 9 of its own, which is displayed on the monitor screen 8 (step ST5). This reference point is defined as a point 10 cm above the center (point A) of the eye position (indicated by a dotted line) of the image 9, or, as a point corresponding to the parietal portion (where the CCD camera 5 should be originally positioned) of the image 9 in a contour which is easily obtained upon binarization processing.

Subsequently, a position 81 corresponding to the actual set position of the CCD camera 5 is obtained from absolute coordinates 80 of the monitor screen 8. It is determined whether a shift amount between a position 82 of the reference position and the actual position 81 falls within an allowance (step ST6). If the shift amount falls outside the allowance, it is determined that the display position of the interlocutor's image 9 shifts. A vector 83 starting from the coordinates 82 of the reference point and terminating at the actual position 81 is calculated (step ST7). The shifting image 9 is translated on the basis of the resultant vector 83, as shown in FIG. 16 (step ST8).

According to the gist of the present invention, any one of the above-described first to third means can be used as a means for matching the lines of sight between interlocutors through the transmission means. In a two-way interactive operation, the distance L between the chair 4 and the monitor TV 1 is fixed within a predetermined range, and the height of the chair 4 is adjusted in the vertical direction by the sitting height adjustment mechanism 40 on both the interlocutor sides. With this operation, the position of the face of the image 9 of the interlocutor 3, which is displayed in the monitor screen 8, is set in an almost predetermined area. The present inventor confirmed as a result of an experiment that the range requiring fine adjustment of the face size or eye position of an individual interlocutor was several cm to several tens cm. Therefore, for such fine adjustment, the display position of the image 9 of the interlocutor 3, which is displayed on the monitor screen 8, can be effectively moved by the second means. With this display movement, the lines of sight between interlocutors can be easily matched only by adjusting the sitting height adjustment mechanism 40 of the chair 4. In addition, no complex moving mechanism or optical processing unit is required on the CCD camera 5 side. In the above embodiment, the CCD camera 5 is set at a position 10 (cm) above the eye position of the image 9 of the interlocutor 3, which is displayed on the monitor screen 8. However, when image display movement by the third means is performed, the distance h can be easily changed.

The image pickup apparatus 600 of this embodiment can be attached to a commercially available TV set as an option. For this reason, no dedicated machine need be developed, unlike the second prior art in which a display apparatus for selecting reflection/transmission is used, so that an inexpensive pickup apparatus can be realized. In addition, unlike the first and third prior arts, no optical part, e.g., neither special half mirror nor reflecting mirror is required. For this reason, the arrangement is simplified, so that the image of an interlocutor can be prevented from being darkened by a mirror. In the prior art, a large mirror is used to obtain a large field angle, impeding screen display. However, such a problem is not posed in the pickup apparatus according to the above-described embodiment. Therefore, according to the two-way interactive system of the present invention, a two-way interactive operation using an image display apparatus with a wide screen can be easily realized.

Figure 17:
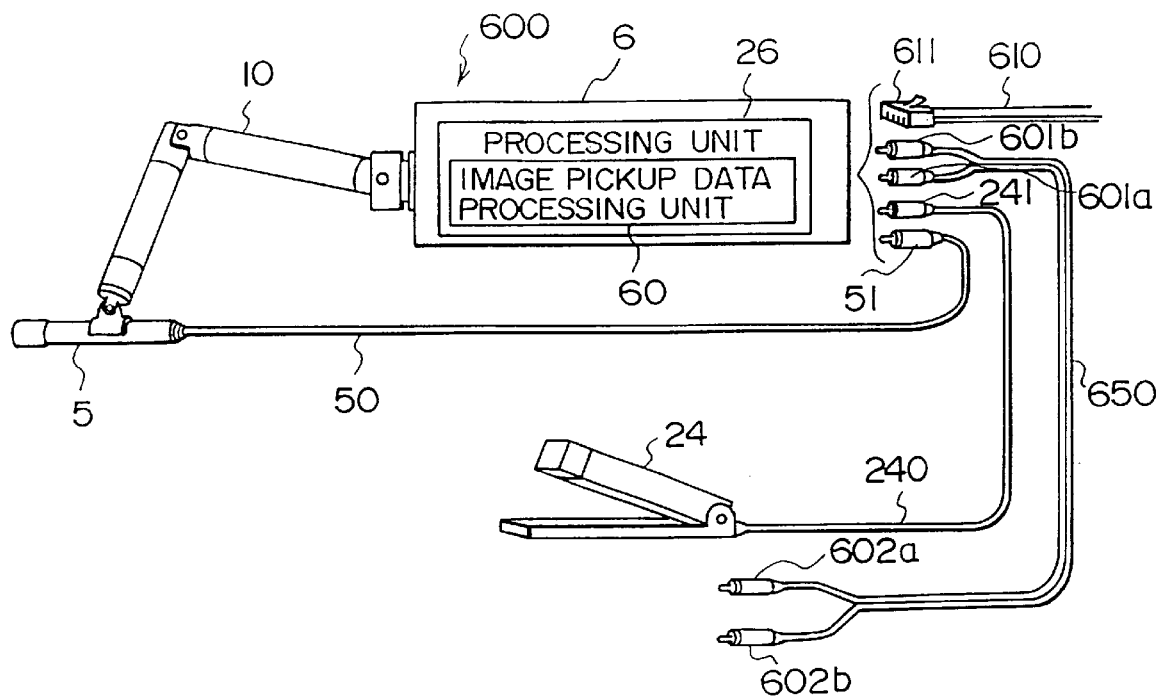
FIG. 17 is a view showing an application of a single image pickup unit (image pickup apparatus) in FIG. 1.
Figure 18:
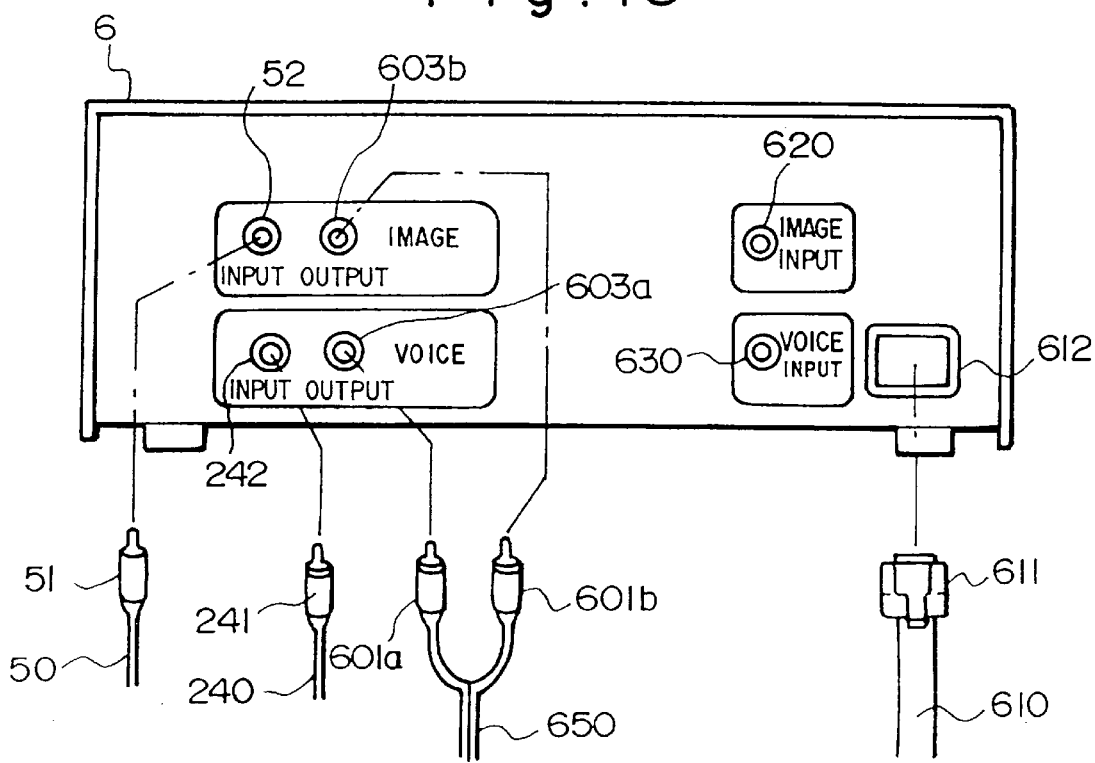
FIG. 18 is a view showing the structure of the rear surface of the image pickup unit shown in FIG. 17.

FIGS. 17 and 18 are views showing the arrangement of the image pickup apparatus 600 which can be attached to a commercially available TV set as an option. As shown in FIGS. 1 and 2, this image pickup apparatus 600 is constituted by the CCD camera 5 for picking up the image of an interlocutor, the support mechanism 10 (robot arm) for supporting the CCD camera 5 and at the same time setting the CCD camera 5 at a desired position, and the image pickup unit 6 incorporating the processing unit 26 including the image pickup data processing unit 60 as a circuit board.

In the image pickup apparatus 600, an electrical signal from the CCD camera 5 is sent to the processing unit 26 electrically connected to a terminal 51 through the camera cable 50. The voice of the interlocutor 3 is received by a microphone 24 and sent to the processing unit 26 electrically connected to a terminal 241 through a cable 240 as an electrical signal. On the other hand, the image data and voice data of an interlocutor, which are sent from the transmission means 27, are received by the processing unit 26 electrically connected to a terminal 611 through a cable 610. The image data and voice data of the partner interlocutor (e.g., the interlocutor 3B at the point B), which are temporarily received by the processing unit 26, are sent to the commercially available TV set through a cable 650. Terminals 601a (voice terminal) and 601b (image terminal) of the cable 650 are electrically connected to the processing unit 26 while terminals 602a (voice terminal) and 602b (image terminal) are connected to predetermined connectors of the TV set.

FIG. 18 is a view showing the detailed arrangement of connectors provided on the rear surface of the image pickup apparatus 600. As is apparent from FIG. 18, the terminal 51 of the CCD camera 5 is inserted and fixed in an image input connector 52. The terminal 241 of the speaker 24 is inserted and fixed in a voice input connector 242. The terminals 601a and 601b of the cable 650 for sending image and voice data to the TV set are inserted and fixed in a voice output connector 603a and an image output connector 603b, respectively. The terminal 611 of the cable 610 for transmitting/receiving data to/from the transmission means 27 is inserted and fixed in a data transmission/reception connector 612. An image input connector 620 and a voice input connector 630 are spare connectors for transmitting/receiving data to/from the transmission means 27.

The logical arrangement of the terminal equipment 20A or 20B in the two-way interactive system according to the present invention will be described below with reference to FIG. 19. This system is oriented to a system for realizing practical counseling between interlocutors in remote areas and has various functions for realizing an ideal counseling environment in addition to a mechanism for matching the lines of sight between the interlocutors. The arrangement to be described below is common to the terminal equipments at the points A and B.

This terminal equipment is an equipment with an integrated arrangement in which the image pickup data processing unit 60 is included in the processing unit 26. The image pickup data processing unit 60 has a data processing unit 600a for receiving image data from the CCD camera 5 and performing predetermined processing, and a driving control unit 600b for controlling a driving mechanism 600c for adjusting the set position and set angle of the CCD camera 5.

A main control unit 273 of the processing unit 26 has at least a person authentication unit 274 (a card-shaped recording medium 289 having at least an IC (Integrated Circuit) and using information read out from an IC card or the like by a read unit 271) for managing the security of this system, an interactive operation processing unit 275 for analyzing/recording the contents of an interactive operation between interlocutors, a backup system 276 for performing crisis management of the entire system (e.g., upon detecting an abnormality in the transmission/reception system, a main transmission/reception system 288 such as an optical fiber is switched to a radio system 287), an external memory management unit 277 for outputting display information or voice analysis information processed in this system to a printer 270 or a card-shaped recording medium 269 such as an IC card having at least an IC, and an integrated information processing system 278 for integrally managing reception, keyword information, counseling item information guidance, counselor information, fee information, and the like by an integrated information D/B (database) 267. The main control unit 273 also perform position recognition of a person's image (including the monitor images of the first and second interlocutors) displayed on the monitor.

The processing unit 26 also has a voice/acoustic data processing unit 279 (e.g., spectrum analysis of voice information) for processing voice information received through the microphone 24, a driving control unit 280 for controlling a driving mechanism 281 for adjusting the set position of the microphone 24, a voice/acoustic output unit 282 for causing speakers 23 to output predetermined voice or acoustic information (the voice/acoustic output unit 282 uses a dedicated voice/acoustic information D/B 265 to realize a volume control function 283 and a BGM output function 284 for providing an ideal counseling environment), a display control unit 285 for displaying image data, character data, and the like on the monitor 1 (the display control unit 285 has a processing function such as an image enlarging/reducing function), and a character/graphic input control unit 286 for controlling a character/graphic input unit 272 serving as a man-machine interface. A plurality of monitors 1 may be arranged, and the display control unit 285 may perform control such that different pieces of information are displayed on first and second monitors 1a and 1b, as shown in FIG. 19 (for example, image information is displayed on the first monitor 1a, and character/graphic information is displayed on the second monitor 1b).

The processing unit 26 also individually has dedicated D/Bs (e.g., an image information D/B 261, a voice/acoustic information D/B 262, a character information D/B 263, a backup D/B 264, the BGM information D/B 265, the integrated information D/B 267, a display information D/B 266, and the like). As the character/graphic input unit 272, a keyboard, a pointing device, or a touch panel and a dedicated pen are available.

The operation of the two-way interactive system as a counseling system will be described below in detail on the basis of the arrangement shown in FIG. 19. FIG. 20 is a view showing the arrangement of the voice output unit 23. When the speakers arranged near ears aside the interlocutor 3 are used, an environment of whispering-into-ears can be realized to improve the intimacy. A headphone is typically used as the voice output unit 23. The independent speakers 12 at ears fixed to the chair 4 through flexible joints 13 are preferably used because they can realize whispering in a non-contact state. The speakers may be attached to the peripheral wall (e.g., sound absorbing members 22A and 22B shown in FIG. 1).

An output from the voice output unit 23 is controlled by the voice/acoustic output unit 282 having the function 284 of outputting a background music (BGM) and the volume control function 283 for automatically detecting the interactive operation volume and adjusting the output volume of the background music. Upon detecting that the interactive operation volume is substantially zero for a predetermined time, the voice/acoustic output unit 282 starts to output a background music or performs adjustment to increase or decrease the volume of the background music on the basis of the detection result. The voice/acoustic output unit 282 can output a background music overlapping the voice of the partner interlocutor to relax the interlocutor 3 without impeding listening to the voice of the interlocutor. Particularly, when silence continues, the tension of the interlocutor 3 can be eased by starting a background music or changing the volume, so that the interlocutor 3 can be calmed.

A directional high-sensitive microphone is preferably used as the voice input unit 24. Generally, a microphone set on a table or at the breast can also be employed. However, a microphone on a table may cause conscious obstacles for counseling. For a microphone at the breast, if the interlocutor carelessly leaves the seat, the cord may be damaged. Therefore, it is preferable that a directional high-sensitive microphone of which the interlocutor is unconscious be set above the display unit 21 or incorporated in the display unit 21. Since the line of sight of the interlocutor 3 is already recognized, the directionality can be improved by setting the microphone toward the mouth.

The voice input unit 24 is controlled by the voice/acoustic data processing unit 279 having a voice input amplification/adjustment function of controlling the input volume, and a volume control function of automatically converting the output volume of an input voice signal into a volume at a predetermined level, detecting the average level of the input volume levels for a predetermined time, and performing automatic conversion of the volume if the difference between the input volume and the average level exceeds a predetermined value. The display unit 21 displays a volume to be transmitted from the voice/acoustic data processing unit 279 to the partner interlocutor side through the transmission means 27 under the control of the main control unit 273 of the processing unit 26. An unexperienced person cannot determine the voice volume when the person talks to another person (the interlocutor's image) on the monitor screen 8 without having a microphone in sight. Therefore, a smoother interactive operation can be realized by adjusting the volume of talk. In addition, when the output volume (the volume of voice information to be sent to the partner side) is displayed on the screen, the volume can be fed back to the interlocutor, so that the interlocutor can determine whether the output voltage is appropriate for transmission.

Character or graphic information input from the character/graphic input unit 272 is displayed on the display unit 21 through the character/graphic input control unit 286. At the same time, character information or graphic information according to characters or graphics input from the character/graphic input unit 272 is transmitted to the terminal equipment 20B at the point B. Therefore, the transmission information transmitted through the transmission line includes not only person's image information (image data) and voice information (voice data) but also character information or graphic information (text data). The display unit 21 displays characters or graphics on the basis of the transmitted character information or graphic information, together with the image 9 of the interlocutor 3 on the partner side. In this manner, smoother counseling can be realized by displaying characters or graphics together with the person's image.

Figure 21:
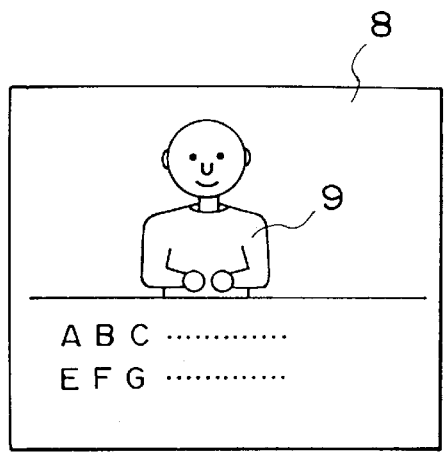
FIG. 21 is a view showing a screen configuration of a display screen displayed on the monitor in FIG. 1 (particularly in screen division display) (1)
Figure 22:
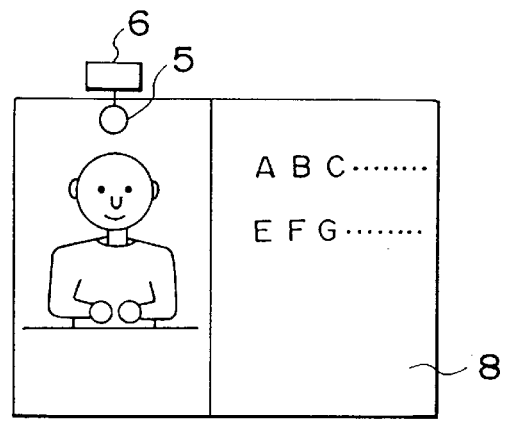
FIG. 22 is a view showing a screen configuration of a display screen displayed on the monitor in FIG. 1 (particularly in screen division display) (2)
Figure 23:
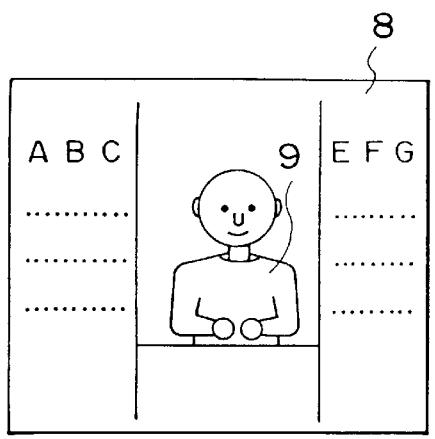
FIG. 23 is a view showing a screen configuration of a display screen displayed on the monitor in FIG. 1 (particularly in screen division display) (3)

Characters or graphics displayed on the monitor TV 1 of the display unit 21 may overlap the image of the interlocutor 3. However, the display area for characters or graphics is preferably separated from the display area for the interlocutor's image 9, as shown in FIGS. 21 to 24. Particularly, when a person's image whose display size is changed-is to be displayed on the monitor, the person's image is moved on the monitor by using the algorithm shown in FIG. 16 (this algorithm can be realized by using either the monitor image of the first interlocutor or the monitor image of the second interlocutor), thereby matching the lines of sight between the first interlocutor and the second interlocutor. When the display area 8 (monitor screen) of the display unit 21 is divided along the horizontal direction, the interlocutor's image 9 is preferably displayed on the upper side (FIG. 21). The interlocutor's image can also be displayed on the left or right side or at the central portion of the display area 8 of the monitor TV 1 of the display unit 21 (FIGS. 22 and 23). Particularly, when the screen is divided along the vertical direction, it is preferable that characters or graphics be displayed on the right side, and the image of the partner interlocutor be displayed on the left side when viewed from the interlocutor who looks at the monitor screen. Generally, a human being performs artistic/subjective thinking in the right brain and calculative/logical thinking in the left brain. Visually, however, the operations of the right brain and the left brain are inverted. Information from the right eye is mainly processed in the left brain, and information from the left eye is mainly processed in the right brain. Therefore, when characters/graphics (logical) and the image of the interlocutor (subjective) are to be simultaneously displayed, the characters/graphics is preferably displayed on the right side, and the person's image is preferably displayed on the left side.

Figure 24:
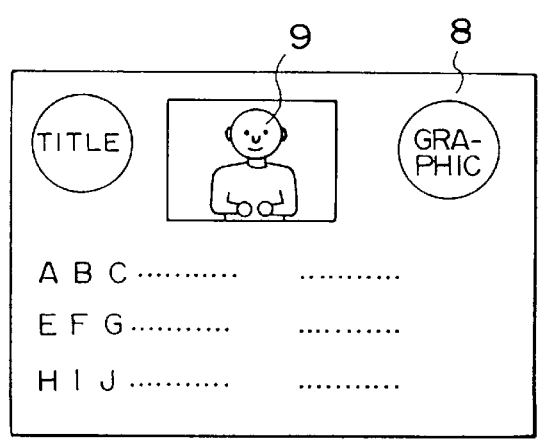
FIG. 24 is a view showing a screen configuration of a display screen displayed on the monitor in FIG. 1 (particularly in screen division display) (4).

As shown in FIG. 24, the interlocutor's image may be displayed at the upper central portion of the display area 8 of the monitor TV 1. In this case, image processing is performed by the display control unit 285 to reduce the interlocutor's image 9.

The display control unit 285 can enlarge or reduce the interlocutor's image 9 (either the first interlocutor or the second interlocutor) displayed on the monitor TV 1. For this processing, part of the image near the parietal portion of the interlocutor's image 9, which corresponds to the actual set position of the camera 5, is detected. While the detected image portion is fixed, the entire interlocutor's image is enlarged or reduced. At least characters or graphics are displayed in a predetermined area on the monitor TV 1, which is outside of the area where the interlocutor's image 9 is displayed.

According to the above-described splitting method, matching of the lines of sight does not degrade. In addition, a display unit for displaying the interlocutor's image and a display unit for displaying characters or graphics can be independently arranged, as a matter of course (for example, the display control unit 285 can independently control displays on the first monitor TV 1a and the second TV monitor 1b, as shown in FIG. 19). Furthermore, the character/graphic input unit 272 may be arranged in one of the terminal equipments 20A and 20B at the points A and B.

Smooth counseling can be realized by simultaneously using characters or graphics. To perform a smooth interactive operation, it is most preferable that the character/graphic input unit 272 can input and recognize the voice of an interlocutor, convert the voice information into character information, and display the character information in accordance with selection of the interlocutor (this function is performed by the voice/acoustic output unit 282 under the control of the main control unit 273).

Figure 19:
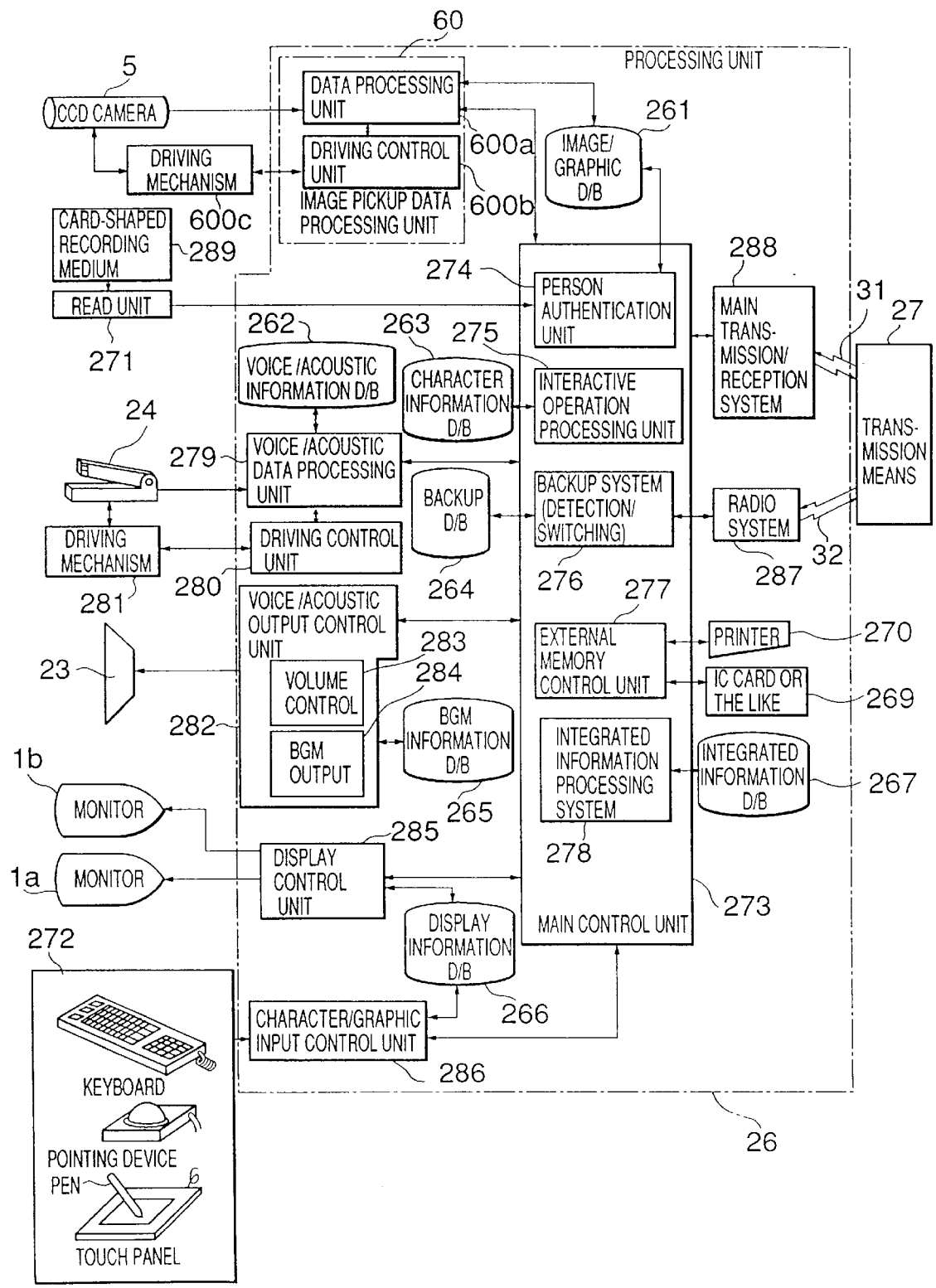
FIG. 19 is a logical block diagram showing the entire arrangement of the terminal equipment shown in FIG. 1.
Figure 20:
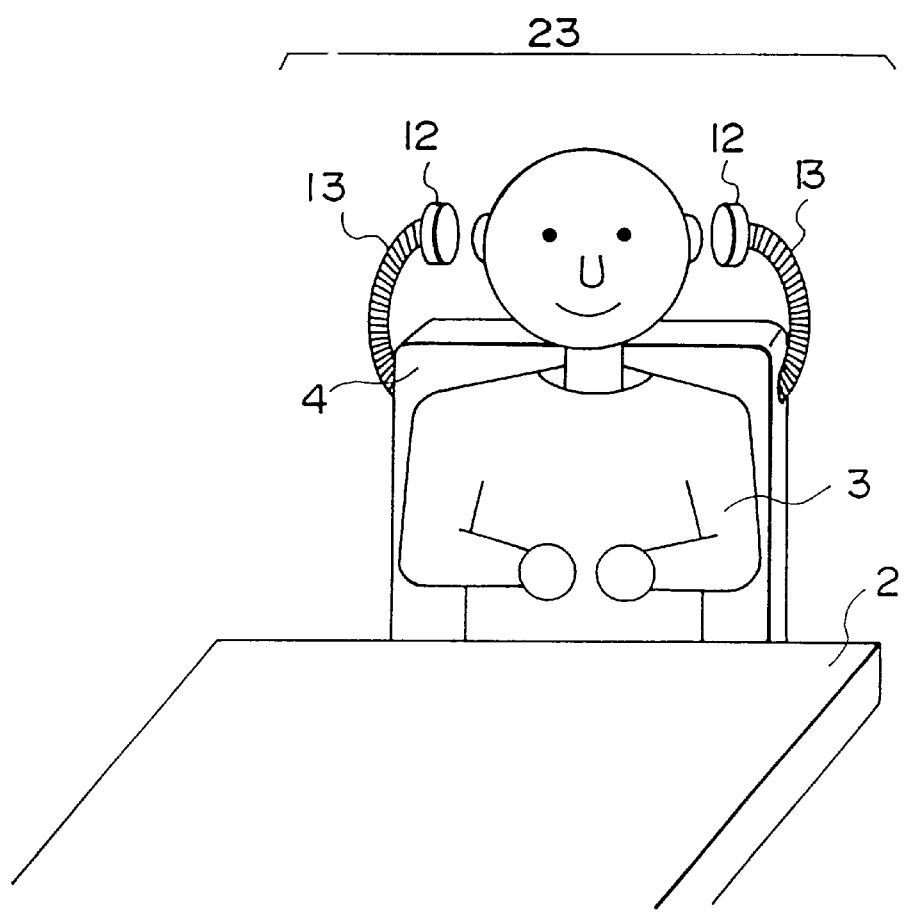
FIG. 20 is a perspective view showing the arrangement of a voice output unit in FIG. 1.

As the character/graphic input unit 272, a keyboard device, a pointing device, or a pen input device (a touch panel and a pen) arranged near at hand of the interlocutor can be employed, as shown in FIG. 19. When both the keyboard device and the pen input device are provided and appropriately selected, further smoother counseling can be realized.

This system has as its object to enable ideal counseling between interlocutors in remote areas. Therefore, to maintain such a special environment, this system has, as a security function, a person authentication means (the person authentication unit 274 in the processing unit 26) for confirming the interlocutor. After the person has been confirmed, a counseling operation is started.

In this case, this system may be characterized in that the person authentication unit 274 reads authentication data from the recording medium 289 in which the authentication data is written, and person confirmation is performed on the basis of the readout result. The recording medium 289 is a card-shaped recording medium having an IC or the like, and an optical memory card, an IC card, or a magnetic card can be used (when the recording medium 289 is to be used, the dedicated read unit 271 is prepared in advance).

The person authentication unit 274 may perform person confirmation on the basis of the image analysis result of the face of an interlocutor, or may perform person confirmation on the basis of the voice analysis result of the voice of an interlocutor, or may perform person confirmation on the basis of the character analysis result of the signature of an interlocutor. Alternatively, person confirmation may be performed on the basis of the text analysis result of the message text of an interlocutor. With this person authentication, the interlocutor can be specified. The authentication method is preferably selected in accordance with confidential contents. The text analysis of the message text means collation analysis between the database or cipher database of a designated person and characters for, e.g., X and Y in a text "X is Y."

The table 2 is set such as, when the interlocutor 3 is sitting on the chair 4, the upper half of the body is above the table. However, the table may also be set such that, when the interlocutor 3 is standing, the upper half of the body is above the table. In an interactive operation in a standing state, an active interactive operation or shortening the interactive operation time can be expected. When the table 2 is used, a sense of continuity is generated between the interlocutor 3 and the monitor screen 8. For this reason, a feeling of uneasiness caused when the relative distance to the partner (mental distance) is lost can be reduced. In this case, the display unit 21 and the table 2 preferably contact each other (arrangement in FIG. 1). However, a mentally negligible gap (e.g., several tens cm or less) may be present.

In counseling or the like-, the processing unit 26 preferably performs interactive operation situation analysis such as interactive operation time analysis, voice spectrum analysis, predetermined term analysis, or body action analysis. As a result, a change in mentality of the interlocutor as a counselee can be quantitatively analyzed (materials for the counselor can also be obtained).

Sound absorbing members 22 having external sound insulating properties are partially arranged around the interlocutor (FIG. 1). As a result, mental obstacles to leakage of interactive operation contents (counseling contents) are decreased, and the sound quality is improved, so that mind concentration is enabled to allow a close interactive operation.

In FIG. 1, two independent transmission lines are prepared as the transmission means 27. However, three or more transmission lines may be prepared. As the transmission lines, a coaxial cable transmission line or other radio transmission lines may be used in addition to the optical fiber transmission line 31 and the satellite communication transmission line 32.

The two-way interactive system according to the present invention has a backup system for detecting a failure in transmission line in use for an interactive operation and automatically switching the transmission line to the one to be used. Since a plurality of transmission lines are connected, if a transmission line fails during an interactive operation (or counseling), another transmission line can be used to continue the interactive operation. In this case, another transmission line preferably ensures at least transmission of voice information. Generally, a possible cause for a line abnormality is an abnormality in a coaxial cable, an optical fiber cable, or a transmission unit. Therefore, another transmission line is preferably a radio system.

A result of an experiment of two-way interactive image communication using the two-way interactive system having the line-of-sight matching mechanism according to the above embodiment will be described below (the detailed system configuration is shown in FIG. 1).

For the experiment, a projection monitor with a 40-inch wide screen, i.e., a screen diagonal of 103.4 cm was used as the monitor TV 1. As the CCD camera 5 for the experiment, a micro camera with a camera head diameter $\Phi$ of 12 mm was used. The monitor TVs 1 were set in adjacent rooms. The distance between the monitors was about 20 m. The distance L between the monitor TV 1 and the interlocutor 3 was about 2 m. The upper half of the body of the interlocutor 3 was picked up within a range of 88 cm (width)×66 cm (height), and the image was transmitted to the monitor TV 1 on the partner side. The CCD camera 5 was fixed 10 cm (=h) above the position of the line of sight of the interlocutor 3. The height of the chair 4 was adjusted in accordance with the sitting height of the interlocutor 3.

In a two-way interactive operation using such a system configuration, when the interlocutor 3 sat on the chair 4 in the normal posture, i.e., in the basic posture, the parallactic angle fell within the range of about 2.86°. Actually, however, the head or upper half of the body of the interlocutor 3 moved during an interactive operation. For six interlocutors, this movement was actually measured. The maximum moving amount was about ±15 cm in the horizontal direction and about ±10 cm in the vertical direction. Taking the movement of the interlocutor 3 into consideration, a parallactic angle in this system configuration was calculated. The parallactic angle was 4.3° at maximum in the horizontal direction of the monitor TV 1, and 5.7° at maximum in the vertical direction. According to this embodiment, the parallactic angle falls within the line-of-sight matching allowance defined in Joint Meeting of Four Electric Institutes, i.e., within the range of 4.5° or less in the horizontal direction, 12° or less in the upper direction and 8° or less in the lower direction. The average values of the movements of the interlocutor 3 were about ±7 cm in the horizontal direction and about ±4 cm in the vertical direction, which were ½ or less of the maximum values. Therefore, it can be said that the parallactic angle obtained in this system poses no problem in an actual interactive operation. As a result of this experiment, a two-way interactive operation could be smoothly performed without causing any particular sense of incompatibility in matching of the lines of sight.

With this experiment, it was confirmed that, when the lines of sight between interlocutors were matched through the transmission means 27, emotional communication between the interlocutors could be realized even about a theme of affliction. In addition, 80% or more subjects confirmed that counseling using this system was possible. Furthermore, by simultaneously using characters or graphics, "character/graphic recognition/interactive operation" in which an interactive operation progresses while referring to characters or graphics is enabled. Therefore, it was also confirmed that close communication and settlement could be performed in a shorter time.

To improve this system, the distance L between the monitor TV 1 and the interlocutor 3 is increased to about 2.5 m, and the display position of the interlocutor's image 9 displayed on the monitor screen is finely adjusted by the display control unit 285 such that the position of the line of sight of the interlocutor 3 always falls within a parallactic angle of 3° or less with respect to the CCD camera 5. With this arrangement, even when the interlocutor 3 finely moves, the lines of sight can be appropriately kept matched, and more practical matching of the lines of sight between interlocutors can be realized.

The above experiment was conducted by using the wide-screen monitor TV 1 and separating the interlocutor 3 to be picked up from the monitor TV 1 by a certain distance. When a small-size monitor, e.g., a 10-inch monitor TV is used as the monitor TV 1, the interlocutor's image displayed on the monitor screen 8 becomes smaller, as a matter of course. Therefore, when a micro CCD image pickup device is combined with this small-size monitor TV, and the ratio of the image pickup device size to that of the monitor TV size is set at a predetermined value or less, the parallactic angle can be decreased. In this case, the distance L between the interlocutor 3 and the monitor TV 1 can be easily decreased to 1 m or less, resulting in an efficiency in space utilization. The present inventor examined a counseling experiment using a 14-inch monitor TV under conditions such as h=5 (cm) and L=1.2 (m). As a result, 83% of 18 clients affirmatively evaluated counseling using this system.

According to the above embodiment, an image pickup apparatus capable of being attached to a conventional monitor TV as an option, using no optical parts, i.e., neither special half mirror nor reflecting mirror, but only the CCD camera 5, and having a line-of-sight matching mechanism with a line-of-sight matching follow-up function can be realized by adding an image processing function (FIGS. 17 and 18). In the above embodiment, the image pickup apparatus is attached to a conventional TV unit as an option. However, the image pickup unit (camera) may be integrated with part of the display unit. More specifically, an image pickup unit such as a CCD camera may be buried in part of a display device such as a liquid crystal display device or a plasma display device. Alternatively, the image pickup unit may be formed in an area of the display unit as part of the display unit (FIGS. 7 to 10). In this case, a dedicated machine must be developed, though this arrangement is very effective for a low-profile monitor in the future.

The present invention is not limited to the above embodiment, and various changes and modifications can also be made. For example, an image printing apparatus (printer 270) for printing a display screen, or a storage means (e.g., the display information D/B 266, the backup D/B 264, the IC card 269, or the like) for storing display screen information can be further arranged. As the storage means, an optical memory card, an IC card, an optical memory disk, or a magneto-optical disk can be used. In this case, information during an interactive operation, and particularly, character or graphic information used during an interactive operation can be stored.

As has been described above, the system according to the present invention is realized on the basis of an experimental result that, even when the image pickup unit (camera) is set in a predetermined area in front of the interlocutor's image displayed on the display unit (when the interlocutor looks at the camera overlapping the partner image), the presence of the image pickup unit arranged between the interlocutor to be picked up and the display unit hardly influence on a two-way interactive operation as far as the size of the image pickup unit is limited to a predetermined value or less.

For this reason, when constituent elements are attached to a conventional display apparatus as an option, a pickup apparatus having a mechanism for realizing matching of lines of sight between interlocutors, a terminal equipment, and a system constituted by these apparatuses can be easily realized. Therefore, no dedicated machine need be developed, so the apparatus can be realized at a low cost. Since the apparatus can be constituted only by fixing the image pickup unit at a predetermined position of the screen, no half mirror in almost the same size as that of the screen is required. For this reason, the space for apparatus arrangement can be small, and the display screen size can be easily increased. In addition, since an interlocutor is directly picked up without using any mirror, the resultant image can be prevented from being darkened.

When the image pickup unit is moved by the driving mechanism to adjust the direction of line of sight of the interlocutor by position adjustment (e.g., sitting height adjustment) of the interlocutor, or when image moving processing is performed by the display control unit to move the display position of the interlocutor's image displayed on the screen of the display unit, the image pickup unit (camera) is set to be present in a predetermined area of the image of the partner interlocutor displayed on the screen when viewed from the interlocutor. By combining these means, a parallactic angle of 3° or less necessary for ideally matching the lines of sight can be easily obtained. Particularly, when image processing is performed by the display processing unit to move the image of the partner interlocutor displayed on the screen to a predetermined position with respect to the image pickup unit, more precise matching of lines of sight or recognition of line of sight can be realized without using any mechanical driving system. In addition, the degree of matching the lines of sight can be changed and set in accordance with the individual level.

The driving mechanism of the image pickup unit performs angle adjustment for the image pickup unit. When the angle of the image pickup direction of the image pickup unit is adjusted, the image pickup direction is automatically set to match the line of sight of an interlocutor whose position is recognized by the image data processing unit. For this reason, even when the interlocutor moves during a two-way interactive operation, the optimum line-of-sight matching state can be maintained between the interlocutors.

When characters or graphics are simultaneously used, "character/graphic recognition/interactive operation (visual communication)", in which an interactive operation progresses while referring to the characters or graphics is enabled. Therefore, close communication and settlement can be performed in a shorter time. As described above, by using this system, a smooth interactive operation through monitor TVs can be performed while realizing emotional communication. In addition, this system can be widely applied to multimedia communication, multimedia counseling, multimedia helping, audio-visual counseling, and the like.

What is claimed is:

1. A terminal equipment adapted to a two-way interactive system for performing transmission and receiving of predetermined data through a predetermined transmission means, said terminal equipment comprising:

a housing;

a display unit having a monitor provided in a front surface of said housing to display an image of a first interlocutor, which is transmitted through transmission means, and a through hole for causing a rear surface of said housing to communicate with a front surface of said monitor;

an image pickup unit for picking up an image of a second interlocutor positioned in front of a monitor screen of said monitor; and a support mechanism for attaching said image pickup unit to said display unit while at least a part of a distal end of said image pickup unit is introduced in the through hole of said display unit;

wherein while an image pickup direction of said image pickup unit is set directly toward the first interlocutor, said distal end of said image pickup unit is positioned so that the second interlocutor can view said image pickup unit at a position where said image pickup unit is located within an image displaying window on said monitor screen of said monitor and above a position of an eye of a monitor image of the first interlocutor, the image displaying window being a region which the monitor image of the first interlocutor is displayed.

2. A terminal equipment according to claim 1, wherein said image pickup unit is attached to said display unit through said support mechanism to freely rotate about a predetermined portion of said image pickup unit, whereby an image pickup direction of said image pickup unit is changed in a desired direction.

3. A terminal equipment according to claim 2, further comprising a driving mechanism for changing an attachment angle between said display unit and said image pickup unit.

4. A terminal equipment according to claim 1, further comprising a processing unit for adjusting a display position of the image of the first interlocutor on said monitor, which is displayed on said monitor, said processing unit specifying a reference point at a virtual position on the monitor image where said image pickup unit should be originally present on the basis of the image of the first interlocutor, the image being received through said transmission means and displayed on said monitor, detecting a shift of the monitor image of the first interlocutor on the basis of coordinates on said monitor corresponding to a position where said image pickup unit is attached and coordinates of the obtained reference point on said monitor, calculating a vector starting from the coordinates of the reference point and terminating at the coordinates corresponding to a set position of said image pickup unit, and translating the monitor image of the first interlocutor on the basis of the obtained vector.

5. A terminal equipment according to claim 4, wherein said processing unit detects display positions of both eyes of the image of the first interlocutor on said monitor, the image being received through said transmission means and displayed on said monitor, and specifies the reference point at a position on said monitor, which is separated upward from a center between both the eyes by a predetermined distance on said monitor.

6. A terminal equipment according to claim 4, wherein said processing unit specifies the reference point at a position on said monitor corresponding to a head portion of the monitor image of the first interlocutor, the image being received through said transmission means and displayed on said monitor.

7. A two-way interactive system according to claim 1, wherein said first terminal equipment comprises a display control unit for enlarging or reducing a person's image displayed on said monitor, said display control unit detecting part of the person's image corresponding to an actual set position of said image pickup unit near a parietal portion of the person's image and enlarging or reducing the entire person's image while fixing the detected part of the person's image.

8. A two-way interactive system according to claim 7, wherein said display control unit displays at least characters or graphics in a predetermined area on said monitor, except for an area where the person's image is displayed.

* * * * *

UNITED STATES PATENT AND TRADEMARK OFFICE
CERTIFICATE OF CORRECTION

PATENT NO. : 6,005,604
DATED : December 21, 1999
INVENTOR(s) : Toshiaki KAKII

It is certified that error appears in the above-identified patent and that said Letters Patent is hereby corrected as shown below:

On the title page, please change the Foreign Application Priority Data from:
Item
"[30] Oct. 18, 1997 [DE] Germany . . . . . . . . . 197 46 132"

to
Item
--[30] Feb. 16, 1995 [JP] Japan . . . . . . . . . . . 028061/1995

Aug. 31, 1995 [JP] Japan . . . . . . . . . . . 223606/1995--.

Signed and Sealed this

Twenty-third Day of January, 2001

Attest:

Q. TODD DICKINSON

*Attesting Officer*  *Commissioner of Patents and Trademarks*